United States Patent
Challita et al.

(10) Patent No.: US 12,376,139 B2
(45) Date of Patent: Jul. 29, 2025

(54) LOCATION AWARE RADIO RESOURCE MANAGEMENT IN CO- EXISTING PUBLIC AND NON-PUBLIC COMMUNICATION NETWORKS USING PREDICTIONS

(71) Applicant: Telefonaktiebolaget LM Ericsson (publ), Stockholm (SE)

(72) Inventors: Ursula Challita, Solna (SE); Kimmo Hiltunen, Esbo (FI); Satyam Dwivedi, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 400 days.

(21) Appl. No.: 17/927,299

(22) PCT Filed: May 25, 2021

(86) PCT No.: PCT/SE2021/050492
§ 371 (c)(1),
(2) Date: Nov. 22, 2022

(87) PCT Pub. No.: WO2021/242166
PCT Pub. Date: Dec. 2, 2021

(65) Prior Publication Data
US 2023/0209586 A1 Jun. 29, 2023

Related U.S. Application Data

(60) Provisional application No. 63/029,779, filed on May 26, 2020.

(51) Int. Cl.
*H04W 72/541* (2023.01)
*G06N 3/0442* (2023.01)
(Continued)

(52) U.S. Cl.
CPC ........ *H04W 72/541* (2023.01); *G06N 3/0442* (2023.01); *G06N 3/08* (2013.01); *H04B 17/373* (2015.01); *H04W 64/006* (2013.01)

(58) Field of Classification Search
CPC ........ G06N 3/044; G06N 3/0442; G06N 3/08; G06N 20/20; H04B 17/373;
(Continued)

(56) References Cited

U.S. PATENT DOCUMENTS 8,194,630 B2 * 6/2012 Qvarfordt ............. H04W 48/08
455/458
8,331,937 B2 * 12/2012 Narasimha .......... H04W 52/367
455/278.1
(Continued)

FOREIGN PATENT DOCUMENTS

CN 102577540 A * 7/2012 .......... H04W 52/146
CN 103329606 A * 9/2013 ............ H04W 24/08
(Continued)

OTHER PUBLICATIONS

International Search Report and Written Opinion of the International Searching Authority for PCT International Application No. PCT/SE2021/050492 dated Jul. 12, 2021.
(Continued)

Primary Examiner — Eric Nowlin
(74) Attorney, Agent, or Firm — Sage Patent Group

(57) ABSTRACT

A computer implemented method performed by a network node in a non-public communication network is provided. The method includes predicting a subsequent position of a first communication device served by a public communication network, wherein the first communication device is causing an interference level on the non-public communication network. The method further includes estimating a level of subsequent interference from the first communica-
(Continued)

tion device for the subsequent position. The method further includes initiating control of radio resources to reduce the estimated interference level from the first communication device.

20 Claims, 11 Drawing Sheets

(51) Int. Cl.
   *G06N 3/08* (2023.01)
   *H04B 17/373* (2015.01)
   *H04W 64/00* (2009.01)
(58) Field of Classification Search
   CPC ......... H04W 28/0226; H04W 28/0236; H04W 28/0958; H04W 64/006; H04W 72/51; H04W 72/541
   See application file for complete search history.

(56) References Cited

U.S. PATENT DOCUMENTS

| | | | | |
|---|---|---|---|---|
| 9,042,258 B2* | 5/2015 | Jung | ...... | H04W 24/10 370/254 |
| 9,042,259 B2* | 5/2015 | Jung | ...... | H04J 11/005 370/252 |
| 9,049,715 B2* | 6/2015 | Xu | ...... | H04W 72/27 |
| 9,072,001 B2* | 6/2015 | Jung | ...... | H04W 24/10 |
| 9,072,020 B2* | 6/2015 | Li | ...... | H04W 36/20 |
| 9,526,108 B2* | 12/2016 | Chang | ...... | H04W 72/541 |
| 9,560,662 B2* | 1/2017 | Siomina | ...... | H04W 24/10 |
| 9,807,620 B2* | 10/2017 | Zou | ...... | H04W 16/16 |
| 10,602,244 B2* | 3/2020 | Struhsaker | ...... | A61B 5/1112 |
| 2010/0061356 A1* | 3/2010 | Qvarfordt | ...... | H04J 11/0093 455/501 |
| 2010/0087203 A1* | 4/2010 | Lee | ...... | H04W 72/541 455/452.2 |
| 2010/0099424 A1* | 4/2010 | Centonza | ...... | H04W 52/367 455/450 |
| 2010/0120447 A1* | 5/2010 | Anderson | ...... | G01S 5/0242 455/456.1 |
| 2010/0323715 A1 | 12/2010 | Winters | | |
| 2011/0039561 A1* | 2/2011 | Narasimha | ...... | H04W 52/146 455/436 |
| 2011/0051684 A1* | 3/2011 | Li | ...... | H04W 36/20 455/437 |
| 2012/0014360 A1* | 1/2012 | Zou | ...... | H04W 16/16 370/338 |
| 2012/0213161 A1* | 8/2012 | Maeda | ...... | H04W 48/02 370/328 |
| 2013/0136110 A1* | 5/2013 | Yamamoto | ...... | H04W 72/541 370/336 |
| 2013/0217402 A1* | 8/2013 | Lin | ...... | H04W 72/54 455/450 |
| 2013/0223267 A1* | 8/2013 | Jung | ...... | H04W 72/541 370/252 |
| 2013/0223268 A1* | 8/2013 | Jung | ...... | H04J 11/005 370/252 |
| 2013/0229938 A1* | 9/2013 | Jung | ...... | H04J 11/005 370/252 |
| 2013/0229971 A1* | 9/2013 | Siomina | ...... | H04W 24/10 370/312 |
| 2013/0336154 A1* | 12/2013 | Pedersen | ...... | H04W 24/08 370/252 |
| 2014/0064247 A1* | 3/2014 | Teyeb | ...... | H04W 36/008375 370/331 |
| 2015/0111592 A1* | 4/2015 | Chang | ...... | H04W 16/10 455/452.1 |
| 2015/0230262 A1* | 8/2015 | Xu | ...... | H04W 72/541 455/452.2 |
| 2018/0352526 A1* | 12/2018 | Frenger | ...... | H04W 56/0035 |
| 2019/0239082 A1* | 8/2019 | Ravishankar | ...... | H04B 7/18528 |
| 2019/0281370 A1* | 9/2019 | Struhsaker | ...... | H04W 4/80 |
| 2020/0008208 A1 | 1/2020 | Kim et al. | | |
| 2021/0051710 A1* | 2/2021 | Cirik | ...... | H04W 74/0833 |
| 2022/0231741 A1* | 7/2022 | Xiao | ...... | H04B 7/0626 |
| 2023/0269771 A1* | 8/2023 | Cimpu | ...... | H04W 74/0866 370/329 |

FOREIGN PATENT DOCUMENTS

| | | | | |
|---|---|---|---|---|
| CN | 102577540 B | * | 3/2015 | ...... H04W 52/146 |
| CN | 102448173 B | * | 4/2015 | ...... H04L 5/0073 |
| DE | 3736020 A1 | * | 10/1987 | |
| EP | 0312690 A2 | * | 5/1989 | |
| EP | 2496022 A1 | * | 9/2012 | ...... H04L 5/0042 |
| EP | 2624650 A1 | * | 8/2013 | ...... H04L 5/0073 |
| EP | 3484225 A1 | | 5/2019 | |
| EP | 2471197 B1 | * | 7/2019 | ...... H04W 36/20 |
| EP | 3949522 B1 | * | 2/2024 | ...... H04W 48/10 |
| JP | 2013542655 A | * | 11/2013 | |
| JP | 5613952 B2 | * | 10/2014 | ...... H04L 5/0073 |
| KR | 20120056836 A | * | 6/2012 | |
| KR | 20120046261 A | * | 7/2012 | |
| WO | WO-2011022126 A1 | * | 2/2011 | ...... H04W 52/146 |
| WO | WO-2011025224 A2 | * | 3/2011 | ...... H04W 36/20 |
| WO | WO-2011052190 A1 | * | 5/2011 | ...... H04L 5/0042 |
| WO | WO-2011150836 A1 | * | 12/2011 | ...... H04L 5/0073 |
| WO | 2012012165 A1 | | 1/2012 | |
| WO | WO-2012116732 A1 | * | 9/2012 | ...... H04W 24/08 |
| WO | 2018041251 A1 | | 3/2018 | |
| WO | 2021091442 A1 | | 5/2021 | |
| WO | WO-2021211024 A1 | * | 10/2021 | ...... H04L 5/14 |
| WO | WO-2021235984 A1 | * | 11/2021 | ...... H04B 1/1027 |

OTHER PUBLICATIONS

Challita et al., "Performance Evaluation for the Co-Existence of eMBB and URLLC Networks: Synchronized versus Unsynchronized TDD," 2019 IEEE 90th Vehicular Technology Conference (VTC2019-Fall), pp. 1-6.
Di Taranto et al., "Location-Aware Communications for 5G Networks: How location information can improve scalability, latency, and robustness of 5G," IEEE Signal Processing Magazine, vol. 31, Nov. 2014, pp. 102-112.
Huang et al., "A Deep-Reinforcement-Learning-Based Approach to Dynamic eMBB/URLLC Multiplexing in 5G NR", IEEE Internet of Things Journal, vol. 7, No. 7, Jul. 2020, pp. 6439-6456.
Roy et al., "A Predictive Framework for Location-Aware Resource Management in Smart Homes," IEEE Transactions on Mobile Computing, vol. 6, No. 11, Nov. 2007, pp. 1270-1283.
Bairagi et al., "Coexistence Mechanism between eMBB and uRLLC in 5G Wireless Networks," IEEE Transactions on Communications 2020, arXiv:2003.04551v1 (Mar. 10, 2020) pp. 1-30.
Institute for Information Industry (III), "Uplink Pre-emption for URLLC Reliability", R1-1804450, 3GPP TSG RAN WG1 Meeting #92bis, Sanya, China, Apr. 16-20, 2018, 3 pages.
Fan et al., "Resource Allocation in Dynamic TDD Heterogeneous Networks under Mixed Traffic," arXiv:1608.06754v1 [cs.NI] Aug. 2016, 12 pages.
Ding et al., "Small Cell Dynamic TDD Transmissions in Heterogeneous Networks," IEEE ICC 2014—Wireless Communications Symposium, pp. 4881-4887.
Communication Regarding Extended European Search Report for European Patent Application No. 21811930.3 dated Oct. 27, 2023, 14 pages.

* cited by examiner

LOCATION AWARE RADIO RESOURCE MANAGEMENT IN CO- EXISTING PUBLIC AND NON-PUBLIC COMMUNICATION NETWORKS USING PREDICTIONS

CROSS REFERENCE TO RELATED APPLICATIONS

This application is a 35 U.S.C. § 371 national stage application of PCT International Application No. PCT/SE2021/050492 filed on May 25, 2021, which claims the benefit of U.S. Provisional Patent Application Ser. No. 63/029,779, filed on May 26, 2020, the disclosures and content of which are incorporated by reference herein in their entireties.

TECHNICAL FIELD

The present disclosure relates generally to communications networks and, more particularly, to location aware radio resource management in co-existing public and non-public communication networks, and related methods and apparatuses.

BACKGROUND

The fifth generation (5G) of mobile networks is envisioned to feature different service classes, including ultra-reliable low-latency communications (URLLC), massive machine type communications (mMTC), and enhanced mobile broadband (eMBB). While eMBB aims at high spectral efficiency, hard latency (e.g., 1 ms) and reliability requirements (e.g., target BLER in between 10-5 and 10-9) may be essential for URLLC applications. In essence, stringent latency and reliability requirements of URLLC may enable new emerging use cases such as factory automation, drone communication, remote control, and remote surgery.

SUMMARY

In various embodiments of the present disclosure, a method performed by a network node in a non-public communication network is provided. The method includes predicting a subsequent position of a first communication device served by a public communication network. The first communication device is causing an interference level on the non-public communication network. The method further includes estimating a level of subsequent interference from the first communication device for the subsequent position. The method further includes initiating control of radio resources to reduce the estimated interference level from the first communication device.

In some embodiments, further operations performed by the network node include generating an indication for detecting that the first communication device is proximate the non-public communication network.

In some embodiments, further operations performed by the network node include receiving an indication from the non-public communication network detecting that the first communication device is proximate the non-public communication network.

In some embodiments, further operations performed by the network node include localizing the communication device when the indication indicates that the first communication device is proximate the non-public communication network.

In some embodiments, further operations performed by the network node include updating the machine learning model for each of a defined time interval until the first communication device is localized to a non-proximate position to the non-public communication network or when the interference level is equal to or less than a second defined threshold.

In other embodiments of the present disclosure, a method performed by a network node in a public communication network is provided. The method includes detecting that a communication device served by the public communication network is expected to interfere with a non-public communication network. The method further includes performing an action to reduce the interference from the communication device. The action is based on at least one or more of a scheduling limitation, a transmission power limitation, a handover (HO), a split of resource block, an alternative route, and a non-allowed location.

In some embodiments, further operations performed by the network node in a public communication network include detecting that the communication device is in a position that is not expected to cause interference with the non-public communication network. The operations further include removing the scheduling limitation or the transmission power limitation.

In some embodiments, further operations performed by the network node in a public communication network include allowing the communication device to use a same frequency with the non-public communication network based on a decrease of interference with the non-public communication network.

Corresponding embodiments of inventive concepts for a network node in a non-public network, a network node in a public network, computer program products, and computer programs are also provided.

When a non-public communication network and a public communication network operate within the same geographical area and within the same frequency band, the networks can suffer from a certain level of inter-network interference. In some approaches, interference mitigation mechanisms may be reactive and may not be able to have an immediate impact on the inter-network interference levels. As a consequence, the victim network may suffer from some amount of residual interference. Such an approach may not be desirable for URLLC services having, e.g., stringent reliability requirements.

Various embodiments of the present disclosure may provide solutions to these and other potential problems. Various embodiments may include location-aware radio resource management for enhancing the co-existence of a public communication network and a non-public communication network. As a consequence, an interference level on the non-public communication network originating from a communication device(s) served by a public communication network may be proactively reduced.

BRIEF DESCRIPTION OF DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
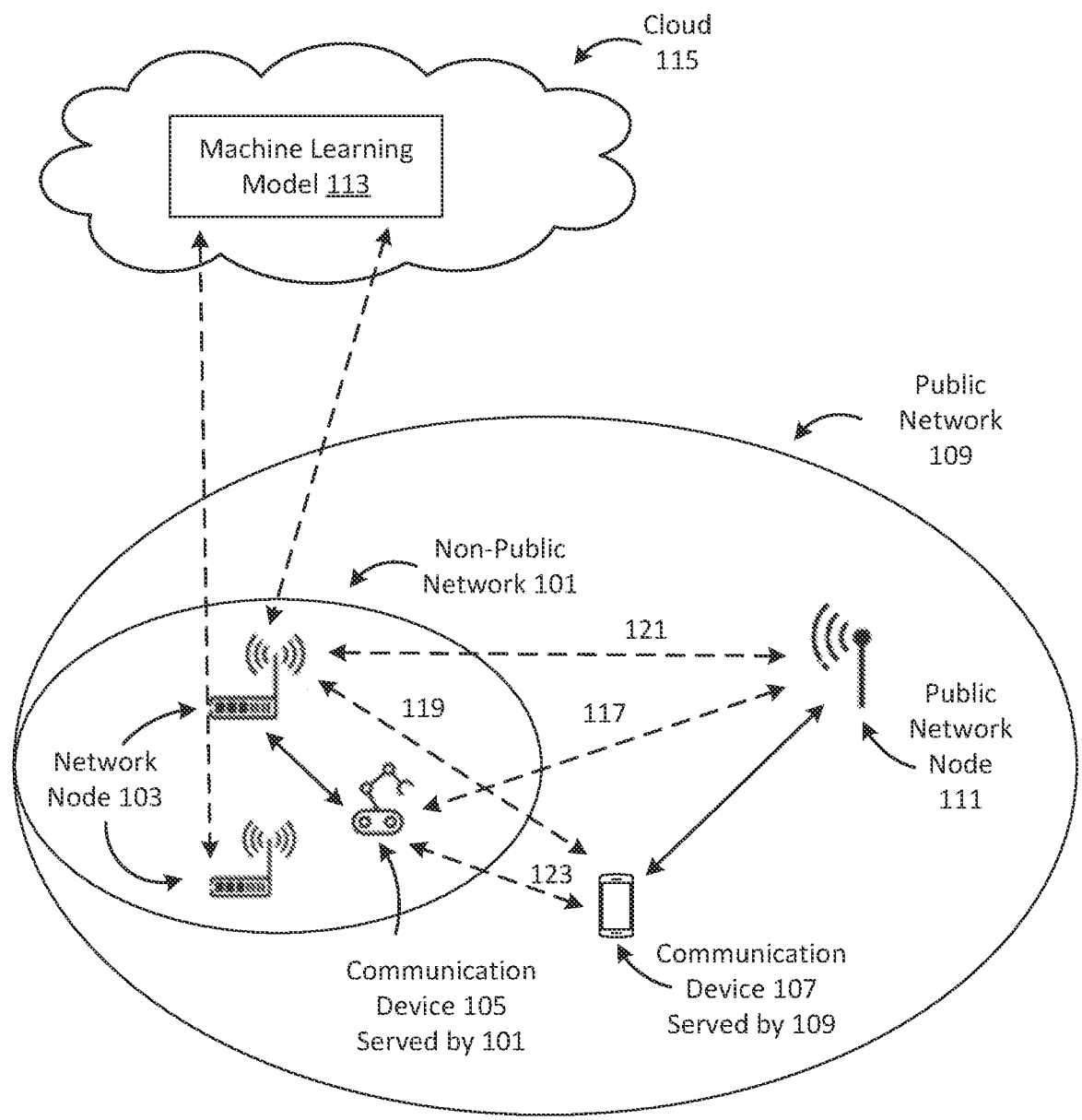
FIG. 1 is a block diagram illustrating a public communication network and a non-public communication network in accordance with some embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

An exemplary embodiment of a use case for a URLLC network includes factory automation with a latency requirement of 1 ms and reliability requirement of 99.999%. For such a use case, a method may be needed for a co-existence scenario where a local factory network has to fulfill the desired latency and reliability requirements while being interfered with by an overlaid macro network offering wide area coverage in the same frequency band. See e.g., Q. Fan, H. Lu, P. Hong, and C. Chen, "Resource Allocation in Dynamic TDD Heterogeneous Networks under Mixed Traffic", arXiv:1608.06754, August 2016; M. Ding, D. Lopez-Perez, W. Chen, "Small cell dynamic TDD transmissions in heterogeneous networks", Proc. of IEEE International Conference on Communications (ICC), Sydney, Australia, June 2014; U. Challita, K. Hiltunen, M. Tercero, "Performance evaluation for the co-existence of eMBB and URLLC networks: synchronized versus unsynchronized TDD", VTC Fall, Honolulu, Hawaii, USA, September 2019.

Beamforming will now be discussed. A transmitter power gain can be achieved by a user equipment (UE) with multiple antennas. For example, by spreading the total transmission power wisely over multiple antennas, a power gain can be achieved which increases the signal quality. The transmitted signal from each antenna is formed in such way that the received signal from each antenna adds up coherently at the receiver, referred to as beam-forming. Precoding describes how to form each antenna in an antenna array in order to form a "beam". A codebook is a set of precoding/beam-forming vectors that typically are used to reduce the signaling overhead and/or computational complexity. Typically, a codebook lists precoding vectors for digital precoding, while analog precoding is designed as part of the design of a physical antenna.

The following explanation of potential problems with some approaches is a present realization as part of the present disclosure and is not to be construed as previously known by others. If, e.g., a non-public URLLC factory network and a public eMBB macro network are operating within the same geographical area and within the same frequency band, the networks can suffer from a certain level of inter-network interference. For example, the URLLC base stations and mobile stations can be interfered with by the uplink (UL) transmissions from close-by eMBB mobile stations. In some approaches, interference mitigation mechanisms may be reactive, e.g., interference mitigation actions are taken when sufficiently high level of interference has been detected. Furthermore, due to processing and signaling delays, as well as uncertainties related to the measurements, the mechanisms may not be able to have an immediate impact on the inter-network interference levels. This means that the victim network may suffer from some amount of residual interference. While such an approach may be acceptable for best-effort-types of services, like eMBB for example, the approach may not be desirable for URLLC services having, e.g., stringent reliability requirement.

While various embodiments of the present disclosure are explained in the non-limiting context of the co-existence of an eMBB macro network and a URLLC factory network, the invention is not so limited. Instead, the embodiments can apply across any public communication network operating in a proximate geographical area of any non-public communication network, and within the same frequency band. For example, such as a co-existence scenario between a public indoor (e.g., factory) network and a non-public indoor network operating within the same building where there are communication devices (e.g., EMBB users) served by the public communication network, and not allowed to access the non-public communication network, in proximity of a network node(s) and communication device(s) of the non-public communication network (e.g., URLLC network).

Unless otherwise noted, the term non-public communication network may be used interchangeably herein with URLLC network, factory network, URLLC factory network, non-public network, and non-public indoor network.

Unless otherwise noted, the term public communication network may be used interchangeably herein with public macro network, public eMBB network, public eMBB macro network, eMBB network, macro network, and public network.

Various embodiments of the present disclosure may provide solutions to these and other potential problems. In various embodiments of the present disclosure, a method is provided for location-aware radio resource management for enhancing the co-existence of a public communication network (e.g., a eMBB macro network) and a non-public communication network (e.g., a URLLC factory network). In various embodiments of the present disclosure, an interference level on the non-public communication network (e.g., a URLLC network) originating from a communication device(s) served by a public communication network (e.g., eMBB UE(s) within a factory) may be proactively reduced.

Unless otherwise noted, the term communication device served by a public communication network may be used interchangeably herein with eMBB user, eMBB user device, mobile station macro ($MS_m$), macro mobile station (macro MS), public communication network communication device, and user of public network.

Unless otherwise noted, the term communication device served by a non-public network may be used interchangeably herein with URLLC user, mobile station factory ($MS_f$), factory user, non-public communication network communications device, and user of non-public network.

Some embodiments of the present disclosure provide a method that includes one or more of the following operations:

- A URLLC node(s) within the factory determines if an eMBB user(s) is approaching or is inside the factory;
- If the eMBB user(s) is/are within the factory, a URLLC network node(s) localizes the eMBB user(s);
- The URLLC network node(s) predicts the future steps/locations of the eMBB user(s) within the factory; and
- The URLLC network node(s) takes actions to proactively minimize the interference level from the eMBB user(s), for example, proactive radio resource management based on future locations of the eMBB user(s). An eMBB network node can also take actions to proactively minimize the interference its users are causing towards the URLLC network.

Potential advantages provided by various embodiments of the present disclosure may include that, by including position prediction and estimation of a level of subsequent interference, it may be possible to initiate control of radio resourced to reduce the estimated interference level. An additional potential advantage may be that in some embodiments the method may: increase or guarantee quality of service for communication devices served by the non-public communication network (e.g., a URLLC network); provide higher service availability within the non-public communication network (e.g., within a factory served by the URLLC network); provide adaptiveness to network dynamics (e.g., network dynamics of the non-public communication network and/or the public communication network); and/or provide proactive radio resource management.

FIG. 1 is a block diagram illustrating a public communication network and a non-public communication network in accordance with some embodiments of the present disclosure. Non-public communication network 101 includes one or more network nodes 103 and one or more communication devices 105 served by non-public communication network 101. Public communication network 109 operates in a proximate geographical area to non-public communication network 101, and within the same frequency band. Public communication network 109 includes one or more network nodes 101 and one or more communication device(s) 107 served by public communication network 109. Machine learning model 113 (discussed further herein) may be located and trained in cloud 115, and may be deployed to network node(s) 103. Network node(s) 103 may also train machine learning model 113, and may upload a trained machine learning model 113 to cloud 115.

Unless otherwise noted, the term network node in a non-public communication network may be used interchangeably herein with URLLC node, factory node, factory base station (factory BS), factory transmission point (TxP), transmission point (TxP) network node, and URLLC base station.

Unless otherwise noted, the term network node in a public communication network may be used interchangeably herein with macro network node, macro node, macro base station (macro BS), public network base station, and public network base station.

Referring to FIG. 1, public communication network 109 and non-public communication network 101 are operating in a proximate geographical area, and within the same frequency band. As a consequence, they may interfere with each other in various ways including, without limitation, the following four inter-network interference scenarios as illustrated in FIG. 1 by dashed lines 117, 119, 121, and 123:

1. Interference 117 from a public communication network node 111 (e.g., a base station (BS)) towards a communication device 105 served by non-public communication network 101 (e.g., a mobile station (MS)), i.e., downlink-to-downlink interference ("interference scenario 1"). Interference scenario 1 may occur for deployments with frequency division duplex (FDD), unsynchronized time division duplex (TDD) or synchronized TDD;
2. Interference 119 from a communication device 107 served by a public communication network 109 (e.g., a mobile station (MS)) to a non-public communication network node 103 (e.g., a BS) ("interference scenario 2"). Interference scenario 2 may occur for deployments with FDD, unsynchronized TDD or synchronized TDD;
3. Interference 121 from a public communication network node 111 (e.g., a BS) to a non-public communication network node 103 (e.g., a BS), i.e., downlink-to-uplink interference ("interference scenario 3"). Interference scenario 3 may occur for deployments with unsynchronized TDD; and
4. Interference 123 from a communication device 107 served by a public communication network 109 (e.g., a mobile station (MS)) to a communication device 105 served by non-public communication network 101 (e.g., a MS), i.e., uplink-to-downlink interference ("interference scenario 4). Interference scenario 4 may occur for deployments with unsynchronized TDD.

Downlink (DL) interference from a high-power macro BS towards a factory BS (inter-network interference scenario 3 discussed above) and MS (inter-network interference scenario 1 discussed above) have been described as a main source of interference for both unsynchronized and synchronized TDD. See e.g., U. Challita, K. Hiltunen, M. Tercero, "Performance evaluation for the co-existence of eMBB and URLLC networks: synchronized versus unsynchronized TDD", VTC Fall, Honolulu, Hawaii, USA, September 2019. In particular, such downlink interference may occur when the coverage areas of the two networks are not overlapping, such as when macro users are not allowed to be located within the factory, and when factory users are not allowed to be located outside the factory.

A method for addressing this kind of inter-network interference has been proposed. See e.g., U. Challita and K. Hiltunen, "A Method for Enhanced co-existence of eMBB and URLLC networks for the case of unsynchronized TDD", 2019.

Various embodiments of the present disclosure address inter-network interference scenarios 2 and 4 (discussed above). That is, uplink interference 119 and/or 123 from a macro MS 107 towards factory BS 103 and factory MS 105, respectively. Generally, for this type of interference to have a significant impact on the performance of the factory network, the macro user may have to be located either inside, e.g., a factory or in some other way in a close proximity with the factory BS 103 and factory MS 105, e.g., outside the factory, but next to a factory window. Furthermore, due to potentially high wall penetration loss of the factory or building, macro MS 107 located inside or proximate the factory may have to transmit with a high power level, which will increase the level of uplink interference 119 and/or 123 towards the factory BS 103 and factory MS 105 even further.

Figure 2:
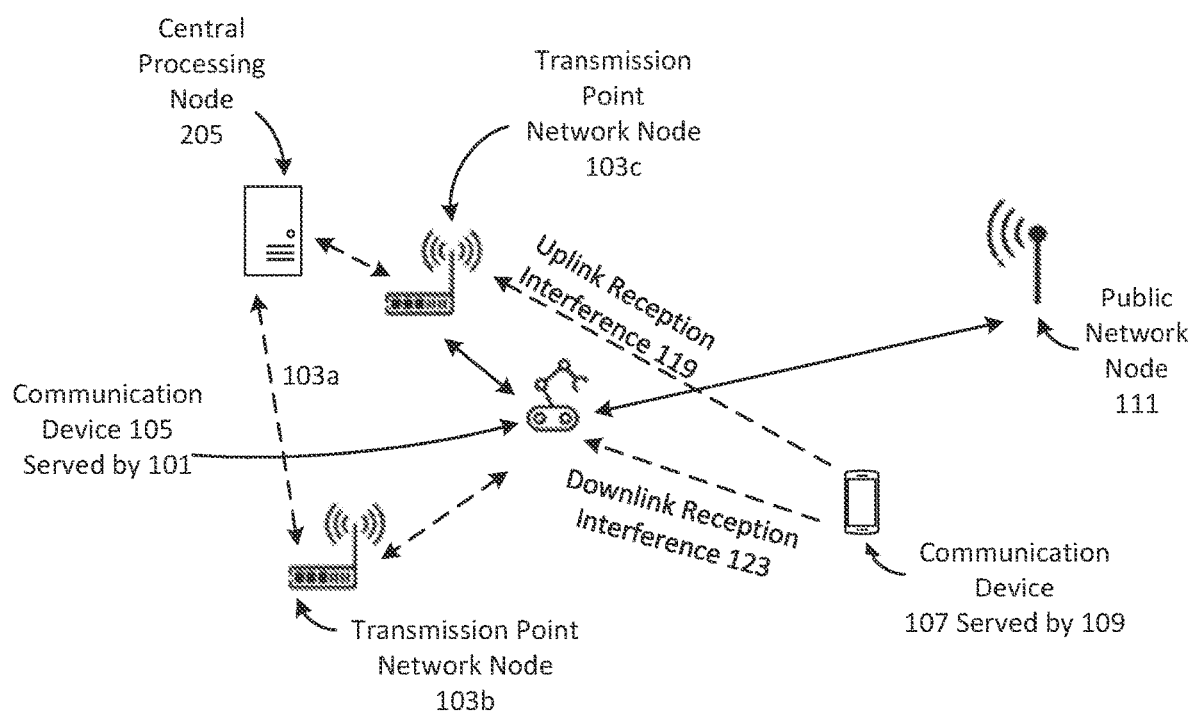
FIG. 2 is a block diagram illustrating two uplink interference scenarios.

FIG. 2 is a block diagram illustrating two uplink interference scenarios 119 and 123 in more detail. Referring to FIG. 2, communication device 107 (also referred to herein as $MS_m$) served by the public communication network 111 is located in proximity to a non-public (e.g., factory) network 101 (e.g., a URLLC network). The non-public communication network 101 (e.g., URLLC network) includes both transmission point (TxP) network nodes 103b, 103c and communication device 105 served by non-public communication network 101 (e.g., factory mobile station(s) ($MS_f$)). Transmission points 103b, 103c in non-public communication network 101 (e.g., factory transmission points) can be either stand-alone base stations, or connected to a centralized processing node 205 in which case the factory base station includes multiple geographically distributed TxPs. In the first case, $MS_f$ 105 can in most of the cases be assumed to be served by one TxP 103b, 103c at a time, while in the latter case the URLLC network 101 can potentially be able to allow multiple TxPs 103b, 103c to simultaneously serve the same $MS_f$ 105 (e.g., the URLLC network 101 can be capable of performing multi-point transmission (Tx) and reception (Rx) for example to improve the quality of the link between the URLLC base station 103b, 103c and the $MS_f$ 105).

If the macro (eMBB) network 111 and the factory (URLLC) network 101 are synchronized, $MS_m$ 107 may only interfere with uplink reception at the factory transmission points 103a and/or 103b (as illustrated in FIG. 2 by dashed line 119). However, if the networks 101, 111 are unsynchronized, part of the time, $MS_m$ 107 may interfere with the uplink reception at the TxPs (dashed line 119), while the rest of the time it may interfere the downlink reception at $MS_f$ (dashed line 123). Note that interference scenario 2 may typically affect individual URLLC users 105, while interference scenario 1 may potentially affect multiple URLLC users 105 served by the interfered TxP 103a or 103b.

As used herein, communication device refers to a device capable, configured, arranged and/or operable to communicate wirelessly with network nodes and/or other wireless devices. (A communication device may be provided, for example, as discussed herein with respect to communication devices 105, 107, wireless device UE 4110, wired or wireless devices UE 4110b, 4110c of FIG. 10, and/or UE 4200 of FIG. 11, all of which should be considered interchangeable in the examples and embodiments described herein and be within the intended scope of this disclosure, unless otherwise noted.) Communicating wirelessly may involve transmitting and/or receiving wireless signals using electromagnetic waves, radio waves, infrared waves, and/or other types of signals suitable for conveying information through air. In some embodiments, a communication device may be configured to transmit and/or receive information without direct human interaction. For instance, a communication device may be designed to transmit information to a network on a predetermined schedule, when triggered by an internal or external event, or in response to requests from the radio communication network. Examples of a communication device include, but are not limited to, a smart phone, a mobile phone, a cell phone, a voice over IP (VoIP) phone, a wireless local loop phone, a desktop computer, a personal digital assistant (PDA), a wireless camera, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A communication device may support device-to-device (D2D) communication, for example by implementing a 3rd Generation Partnership Project (3GPP) standard for sidelink communication, and may in this case be referred to as a D2D communication device. As yet another specific example, in an Internet of Things (IoT) scenario, a communication device may represent a machine or other device that performs monitoring and/or measurements, and transmits the results of such monitoring and/or measurements to another communication device and/or a network node. The communication device may in this case be a machine-to-machine (M2M) device, which may in a 3GPP context be referred to as a machine-type communication (MTC) device. As one particular example, the communication device may be a user device implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a communication device may represent a vehicle or other equipment that is capable of monitoring and/or reporting on its operational status or other functions associated with its operation. A communication device as described above may represent the endpoint of a wireless connection, in which case the device may be referred to as a wireless terminal. Furthermore, a communication device as described above may be mobile, in which case it may also be referred to as a mobile device or a mobile terminal.

As used herein, network node refers to equipment capable, configured, arranged and/or operable to communicate directly or indirectly with a communication device and/or with other network nodes or equipment in the radio communication network to enable and/or provide wireless access to the user device and/or to perform other functions (e.g., administration) in the radio communication network. (A network node device may be provided, for example, as discussed herein with respect to network node 103, 300, 600, and/or network node 4160 of FIG. 10, all of which should be considered interchangeable in the examples and embodiments described herein and be within the intended scope of this disclosure, unless otherwise noted.) Examples of network nodes include, but are not limited to, access points (APs) (e.g., radio access points), base stations (BSs) (e.g., radio base stations, Node Bs, evolved Node Bs (eNBs, also referred to as E-UTRAN NodeB), gNode Bs (including, e.g., CU 107 and DUs 105 of a gNode B (gNB), etc.). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., Mobile Switching Center (MSCs), Mobility Management Entity (MMEs)), Operation and Maintenance (O&M) nodes, Operations Support System (OSS) nodes, Self Optimized Network (SON) nodes, positioning nodes (e.g., Evolved Serving Mobile Location Center (E-SMLCs)), and/or Minimization of Drive Tests (MDTs). As another example, a network node may be a virtual network node. More generally, however, network nodes may represent any suitable device (or group of devices) capable, configured, arranged, and/or operable to enable and/or provide a user device with access to the radio communication network or to provide some service to a user device that has accessed the radio communication network.

Various embodiments of the present disclosure include a method to reduce or minimize an interference level of a public communication network communication device (e.g., a macro (eMBB) user) within a building, structure or other location (e.g., a factory) can cause on non-public communication network communications devices (e.g., factory (URLLC) users) by allowing the non-public communication network (e.g., factory (URLLC) network) to localize a public communication network communication device(s) (e.g., macro (eMBB) user(s)). This can, in turn, allow the public communication network (e.g., macro (eMBB) network) and/or the non-public communication network (e.g., factory (URLLC) network(s)) to adjust the usage of their radio resources in a way that would minimize the interference level caused on the non-public communication network (e.g., factory (URLLC) network) and improve or guarantee the reliability and latency requirements for actions in the non-public communication network (e.g., factory automation).

Various operations that can be included in the method of various embodiments will now be further described.

In some embodiments, a first operation is performed by a network node within a building or structure of a non-public communication network to determine if a communication device(s) served by a public communication network is approaching or is inside the building or structure. For example, URLLC nodes within a factory determine if a eMBB user(s) is approaching or is inside a factory.

In an exemplary embodiment, the URLLC node(s) detects whether an eMBB user is inside the factory. This can be based on a binary classification method relying on machine learning models such as random forest or feed-forward neural network. The input to the machine learning model (e.g., machine learning model 113) can be, but are not limited to:

An interference level on the URLLC users ($MS_f$), or equivalently their SINR values. This input can be included because the interference level on URLLC network may be expected to be higher (and therefore lower SINR) when a $MS_m$ is transmitting in the uplink direction and is within the factory or within the vicinity of the factory. As a consequence, this may have an impact on the uplink and downlink SINR of the $MS_f$ users.

Traffic load or utilization level of neighboring URLLC nodes.

Traffic load level of the $MS_f$ users.

If the URLLC network belongs to the same operator as the macro network, the macro network can inform the URLLC network of its historical TDD pattern which can also be used as an input to the machine learning model.

In some embodiments, in a training phase, data can be collected from multiple URLLC nodes and over several days and the training can take place at a cloud level. In other embodiments, during an inference phase, a trained machine learning model can be deployed at each URLLC node within the factory.

In some embodiments, once deployed, cross-checking between different URLLC nodes can be adopted for checking similarities between the outcome of their corresponding implemented machine learning models. As a consequence, prediction accuracy may be enhanced. For instance, such an operation can be utilized for triggering a machine learning model update, in case the accuracy level of the prediction of a machine learning model at a certain URLLC node falls below a specific threshold.

In some embodiments, a second operation is performed by a network node when a communication device(s) served by a public communication network is/are detected inside or proximate a building, structure or other location, the non-public communication network can localize the communication device(s). For example, if an eMBB user(s) is/are detected to be inside the factory or in a close proximity of the factory, a URLLC network can localize the eMBB user(s).

In an exemplary embodiment, the eMBB network can share an identifier of the eMBB user to the URLLC network for performing position related measurements. The URLLC network can perform, without limitation, the following operations depending on the positioning method adopted:

If the positioning method is downlink based, where the eMBB user does reference signal (RS) time difference, RSTD, measurements and sends the interference measurements to a location server (also referred to herein as a position server), the URLLC network can send the interference measurements due to the eMBB user to the location server. A position server can use this information as side information to localize the eMBB user.

If the positioning method is uplink-based, then the URLLC network can also measure the time of arrival (TOA) of the signals being transmitted by the eMBB user and can send the TOA and/or RSTD information to the location server.

If the positioning method is round-trip time, RTT, based, then the URLLC network can take role of the eMBB network to perform RTT procedures with the eMBB node. In such a case, one of the URLLC nodes transmits a positioning reference signal, PRS, to the eMBB user.

In some embodiments, the eMBB network can inform the URLLC network about the approaching eMBB user device, such as when the eMBB user device is located in the vicinity of the URLLLC network.

In some embodiments, the URLLC network can estimate an angle of arrival of signals received from the eMBB user device.

In some embodiments, an eMBB user device performs positioning signal exchanges with integrated access and backhaul (IAB) nodes in the URLLC network as sidelink measurement for positioning.

In one embodiment, to avoid interference, the location server changes the positioning method being used to reduce interference to any URLLC network in vicinity of the user device.

In some embodiments, a third operation is performed by a network node in a non-public communication network to predict a future position of a communication device(s) served by the public communication network within or proximate a building, structure or other location, and estimates a corresponding level of inter-network interference from the communication device(s) served by the public communication network towards the non-public communication network.

In an exemplary embodiment, a URLLC network node predicts the future steps/locations of eMBB user(s) within a factory, and estimates a corresponding level of the inter-network interference from the eMBB user(s) towards the URLLC network.

Given the location of the eMBB user(s) within the factory, the URLLC node(s) can predict their future location for the next time interval k (e.g., k subframes or k seconds), based on time series prediction methods. The value of k can be chosen depending on the time required for the URLLC network to take actions (as described herein) to minimize the impact of the interference from the eMBB UE(s). Time series prediction schemes such as recurrent neural networks (RNNs), long-short term memory cells (LSTM), and autoregressive integrated moving average (ARIMA) can be used. Input features for the prediction can be, but are not limited, to the following:

Historical m locations of the eMBB user: Such information can include either the previously predicted values at the URLLC nodes or can be provided earlier from the eMBB network, in case the URLLC network belongs to the same operator as the macro network.

Speed of eMBB user: eMBB users within the factory typically may move at a relatively slow speed.

Factory map: can be typically known to the URLLC base stations

Interference level on the URLLC network.

Based on the estimated future location of a $MS_m$, the URLLC network node estimates the corresponding level of the inter-network interference from $MS_m$ towards the factory base station and the mobile stations. This estimate can be based on, but not limited to, the following input: a map illustrating the factory layout, a map illustrating the radio propagation within the factory, and/or historical signal strength measurements performed by the URLLC network (URLLC base stations and URLLC mobile stations) combined with the locations of the mobile stations.

In some embodiments, a fourth operation is performed by a network node in a non-public communication network to take action to reduce or minimize the interference from a communication device(s) served by the public communication network proximate to or inside a building, structure or other location. A network node in a public communication network can also take actions to reduce or minimize interference its communication device(s) are causing towards the non-public communication network.

In an exemplary embodiment, the URLLC network takes actions to reduce or minimize the interference from eMBB users(s) inside or proximate the factory.

In another exemplary embodiment, the eMBB network can also take actions to reduce or minimize interference its user devices are causing towards the URLLC network.

The actions of the fourth operation include initiating control of radio resources to reduce the estimated interference level from a communication device served by the public communication network. The initiating control of radio resources includes, without limitation, initiating any of the actions described herein.

In location-aware communications, position information can be utilized for a vast set of location-aware radio resource management (RRM) functionalities, such as location-based beamforming and proactive resource allocation.

Based on a predicted future location of the eMBB user(s) within or proximate the factory and the corresponding estimated interference level the eMBB user(s) can cause on the base stations of the URLLC network (compared to a certain predefined interference threshold), the URLLC network can take one or more of the following actions, without limitation, to minimize the interference from macro user(s) $MS_m$ (communication device 107 in FIG. 2) towards URLLC base stations (e.g., TxP 103b, TxP 103c in FIG. 2), which would disturb the uplink reception of the communication from communication device 105 (e.g., URLLC user ($MS_f$)):

If the serving TxP is applying receive (Rx) beamforming, the serving TxP can change the beam shape or the beam selection so that the received interference from $MS_m$ can be reduced or minimized, and the SINR for the affected user(s) devices $MS_f$ can be increased or maximized.

In case of a co-channel operation between the networks, the affected URLLC users are primarily scheduled on the "URLLC-prioritized" resource blocks, as mutually agreed with the macro network. Due to capacity reasons, some of the least affected users may have to be scheduled on the "normal" resource blocks, and for them, some additional actions may be needed to secure a sufficient uplink quality.

Based on a mutual agreement with the macro network, the uplink slots of the macro network can be divided into "URLLC-prioritized" and "normal". In case of overlapping uplink slots (i.e., when both networks schedule an uplink slot at the same time), the URLLC network schedules the uplink transmissions of the affected URLLC user $MS_f$ primarily during the "URLLC-prioritized" slots, when the macro network does not schedule uplink transmissions from the interfering user $MS_m$. However, if the URLLC uplink slot or the sub-slot is shorter than the overlapping "URLLC-prioritized" macro uplink slot, uplink transmission of $MS_m$ can be scheduled on the symbols which are not overlapping with the URLLC uplink symbols. Uplink transmissions of the non-affected URLLC users can be scheduled during any of the URLLC uplink slots.

Uplink transmission power is increased for the affected URLLC users $MS_f$ by adjusting the uplink power control parameters.

If a $MS_f$ is able to dynamically adjust the beamwidth of the Tx beam, it makes the beam towards the serving BS (TxP) narrower, increasing the antenna directivity, and hence the received signal power at the serving BS (TxP).

Assuming a scenario where $MS_f$ is served by one BS (TxP) at a time, the URLLC network triggers a handover to move the affected $MS_f$ to another BS (TxP), if the estimated uplink SINR is better over there.

Assuming a scenario where $MS_f$ is simultaneously served by multiple TxPs, the URLLC network either gives a higher priority for the link towards the TxP offering a better uplink SINR when combining the received signals, or disconnects the link towards the interfered TxP and continues to utilize only the link towards the less interfered TxP. The URLLC network may also start receiving the transmissions from $MS_f$ at some additional (e.g., more distant) TxPs connected to the same central processing unit, which in a normal situation would be treated as non-beneficial.

Assuming that the URLLC network has deployed multiple new radio (NR) carriers, or can utilize multiple radio access technologies (e.g., New Radio unlicensed spectrum (NR-U) or WiFi operating on unlicensed bands), either one at a time, or simultaneously (utilizing carrier aggregation (CA)), the URLLC network instructs the affected URLLC users $MS_f$ to handover to the secondary carriers or radio access technologies to avoid interference from $MS_m$. In case of carrier aggregation, the network can also prioritize the use of the less interfered NR carrier, or radio access technologies.

If the $MS_f$ is switched from an interfered primary serving BS to a less interfered secondary BS, or if the number of simultaneously serving TxPs are reduced, or if the $MS_f$ is switched to a less capable channel or radio access technology (RAT), the URLLC network can also apply some kind of radio resource management (RRM) mechanism to improve the quality of the uplink connection from $MS_f$ towards the URLLC network. For example, the uplink transmission power can be increased, or a lower modulation and coding scheme (MCS) can be selected to make the link more robust.

Based on the predicted future location of the eMBB user(s) within or proximate the factory and the corresponding estimated interference level it will cause on the individual user devices served by the URLLC network (e.g., compared to a certain predefined interference threshold), the URLLC network can take one or more of the following actions, without limitation, to minimize the interference from macro user(s) $MS_m$ (communication device 107 in FIG. 2) towards URLLC users $MS_f$ (e.g., communication device 105 in FIG. 2), which can be disturbing the downlink reception of the communication from the URLLC base station (e.g., TxP 103*b*, TxP 103*c* in FIG. 2):

If $MS_f$ is applying Rx beamforming, the $MS_f$ changes the beam shape or the beam selection so that the received interference from $MS_m$ can be minimized, and the SINR maximized.

In case of a co-channel operation between the networks, the URLLC network schedules the affected $MS_f$ primarily on the "URLLC-prioritized" resource blocks, as mutually agreed with the macro network. The non-affected URLLC users can be scheduled both on the "URLLC-prioritized" and on the "normal" resource blocks.

Based on a mutual agreement with the macro network, the uplink slots of the macro network can be divided into "URLLC-prioritized" and "normal". In case of cross-link uplink slots (i.e., when macro network schedules an uplink slot and URLLC network schedules a downlink slot), the URLLC network schedules the downlink transmissions of the affected URLLC users $MS_f$ primarily during the "URLLC-prioritized" slots, when the macro network does not schedule uplink transmissions from the interfering user $MS_m$. However, if the URLLC downlink slot or the sub-slot is shorter than the overlapping "URLLC-prioritized" macro uplink slot, uplink transmission of $MS_m$ can be scheduled on the symbols which are not overlapping with the URLLC downlink symbols. Downlink transmissions of the non-affected URLLC users can be scheduled during any of the URLLC downlink slots.

The serving TxP increases the transmission power towards $MS_f$.

If the serving TxP is able to dynamically adjust the beamwidth of the Tx beam, it makes the beam towards $MS_f$ narrower, increasing the antenna directivity, and hence the received signal power at $MS_f$.

Assuming a scenario where a $MS_f$ is served by one BS (TxP) at a time, the URLLC network triggers a handover to move the affected $MS_f$ to another BS (TxP), if the estimated downlink SINR is better over there for example due to a more favorable Rx beam pattern applied by the $MS_f$.

Assuming a scenario where $MS_f$ is simultaneously served by multiple TxPs, the URLLC network either gives a higher priority for the link towards the TxP offering a better downlink SINR when deciding on how to share the data to be transmitted between the different active TxPs, or disconnects the link providing a worse SINR due to the interference from $MS_m$ and continues to utilize only the link providing a better SINR. The URLLC network may also start transmissions towards a $MS_f$ from some additional (e.g., more distant) TxPs connected to the same central processing unit, which in a normal situation would be treated as non-beneficial.

Assuming that the URLLC network has deployed multiple NR carriers, or can utilize multiple radio access technologies (e.g., NR-U or WiFi operating on unlicensed bands), either one at a time or simultaneously (utilizing carrier aggregation), the URLLC network instructs the affected URLLC user $MS_f$ to perform a handover to secondary carriers or radio access technologies to avoid interference from $MS_m$. In case of carrier aggregation, the network can also prioritize the use of the less interfered NR carrier, or radio access technologies.

If the $MS_f$ is switched from an interfered primary serving BS to a less interfered secondary BS, or if the number of simultaneously serving TxPs are reduced, or if the $MS_f$ is switched to a less capable channel or radio access technology, the URLLC network can also apply some kind of RRM mechanism to improve the quality of the link from the URLLC network towards the $MS_f$. For example, the downlink transmission power can be increased, or a lower modulation and coding scheme (MCS) can be selected to make the link more robust.

In case of critical URLLC activity at a certain location and at particular time along the predicted trajectory of the eMBB user, the URLLC network action can inform the macro network (e.g., by sending a special warning message) that the eMBB user is expected to interfere the URLLC network. The macro network can then take this warning into account and take actions to limit the level of the uplink interference towards the URLLC network, as described herein. Once the predicted location of the eMBB user is such that the resulting interference is estimated to be sufficiently low (below a certain predefined threshold), the URLLC network node action can inform the macro network that actions to limit the interference are no longer required.

If the macro eMBB network detects, either based on the information received from the URLLC network or based on the mobility measurements performed by the eMBB user device(s), that one or more of the eMBB user device(s) are expected to interfere with the URLLC network, the eMBB network can perform, without limitation, one or more of the following actions:

Handover the interfering eMBB user device(s) to an adjacent channel, or a completely different frequency band.

Apply restrictions for the uplink transmission power of the interfering eMBB user device(s) by modifying the uplink power control settings.

Apply uplink scheduling restrictions (in time domain) for the interfering eMBB user device(s) so that the uplink transmissions from those user devices are scheduled only during the specific uplink slots or uplink symbols, which have been mutually agreed with the URLLC network. The macro user devices that are estimated not to cause interference towards the URLLC network can be scheduled normally without any restrictions.

In case of a co-channel operation, the networks can agree to split the resource blocks into "URLLC-prioritized" and "normal". The uplink transmissions of the interfering eMBB user devices can then be scheduled (in frequency domain) only on the "normal" resource blocks, reducing the interference towards the URLLC network utilizing primarily the "URLLC-prioritized" resource blocks. The macro user devices that are estimated not to cause interference towards the URLLC network can be scheduled normally without any restrictions.

If the eMBB user device(s) is following some specific pre-programmed route, the macro network can investigate alternative routes for the future to minimize the interference towards the URLLC network. Alternatively, if the eMBB user device(s) is assumed to make the mobility decisions by itself, the macro network may indicate the current device location as "not allowed" for the future mobility choices.

Once the macro network detects, either based on the information received from the URLLC network or based on the mobility measurements performed by the eMBB user devices, that an eMBB user device has moved to a position where it is no longer estimated to cause harmful interference towards the URLLC network, the macro network can remove the scheduling and transmission power limitations for that particular user device. Eventually, if the estimated interference is low enough, the macro network may also allow the eMBB user device to use the same frequency with the URLLC network.

In some embodiments, a fifth operation is performed by a network node. The first and fourth operations described above can be updated (e.g., continuously updated) after each time interval k until $MS_m$ is detected to be outside the factory (via the first operation or when the impact of the predicted inter-network interference is considered to be sufficiently low (compared to some pre-defined threshold) on the operation of the URLLC network.

Various embodiments of the present disclosure provide a location-aware radio resource management method for protecting a non-public communication network (e.g., a URLLC network) from uplink transmissions from a communication device served by a public communication network (e.g., an eMBB user device) when a communication device served by a public communication network is inside or proximate a building, structure or other location (e.g., an eMBB user device in inside a factory). In some embodiments, a network node of the non-public communication network (e.g., a URLLC network node) detects whether there is a communication device served by a public communication network (e.g., an eMBB user) inside or proximate the building, structure or other location (e.g., a factory) that is causing high interference level on the non-public communication network (e.g., the URLLC network). If a communication device served by a public communication network (e.g., an eMBB user device) is detected to be inside or proximate the building, structure or other location (e.g., the factory), the network node of the non-public communication network (e.g., the URLLC network node) localizes this user device and predicts a future trajectory of the user device. The non-public communication network node (e.g., the URLLC network node) can then take several actions to minimize the impact of the high interference from uplink transmissions of a communication device served by a public communication network (e.g., an eMBB user device(s) inside or proximate the building, structure or other location (e.g., a factory) such as increasing operating power.

Figure 3:
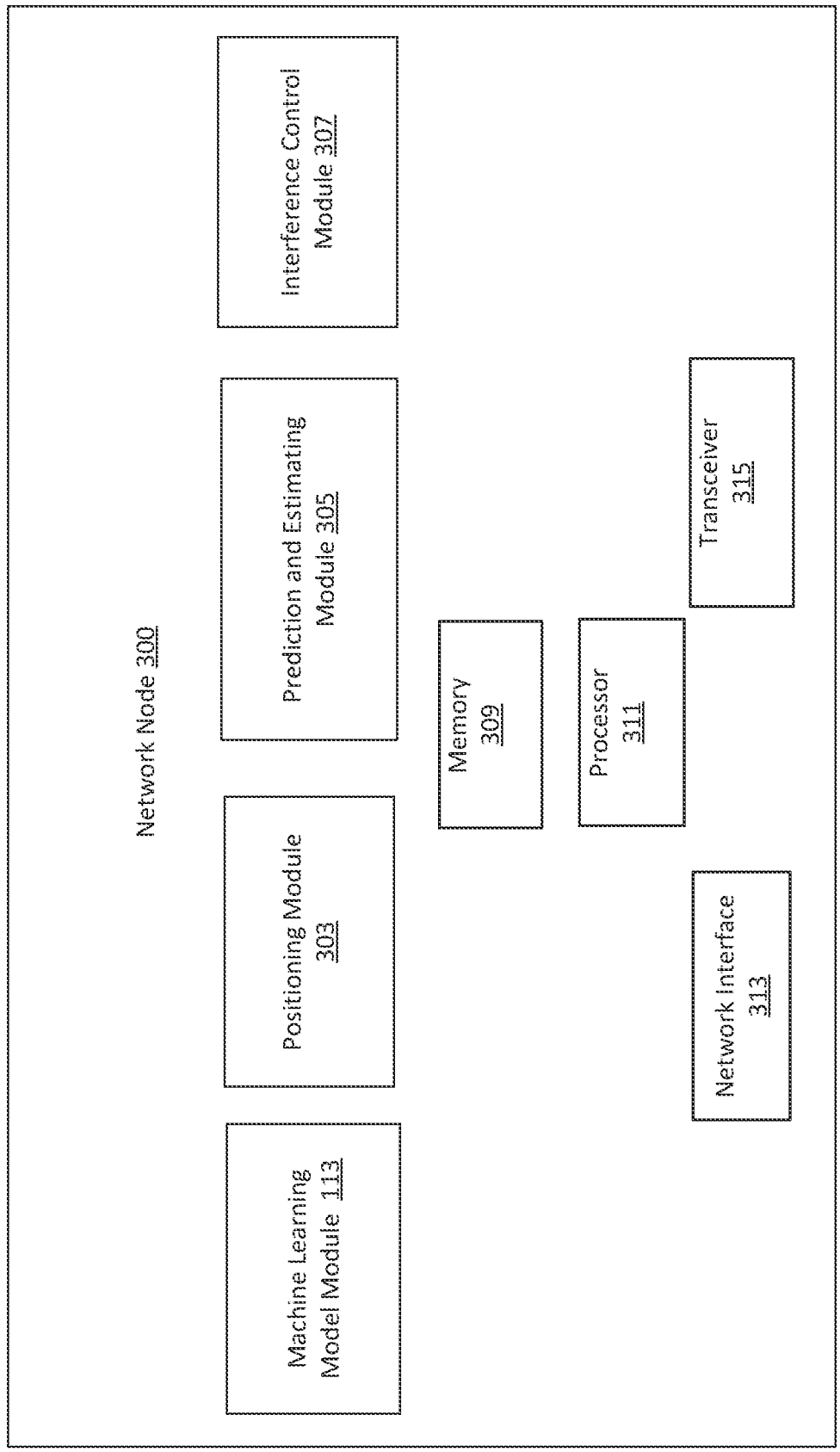
FIG. 3 is a block diagram illustrating elements of an network node 300 of a non-public communication network according to embodiments of the present disclosure.

FIG. 3 is a block diagram illustrating elements of an network node 300 of a non-public communication network according to embodiments of the present disclosure. The network node may include network interface circuitry 313 configured to provide communications with other nodes and device (e.g., with other network nodes and communication devices) of the non-public communication network and a public communication network. The network node may also include processing circuitry 311 (also referred to as a processor) coupled to transceiver circuitry 315, and memory circuitry 309 (also referred to as memory) coupled to the processing circuitry. The network node may also include machine learning model nodule 113, positioning module 303, prediction and estimating module 305, and interference control module 307 coupled to processing circuitry 311, transceiver circuitry 315, and memory circuitry 309. Machine learning model nodule 113, positioning module 303, prediction and estimating module 305, and interference control module 307 may include computer readable program code that when executed by processing circuitry 311 causes the processing circuitry to perform operations according to embodiments disclosed herein. The memory circuitry 309 may include computer readable program code that when executed by the processing circuitry 311 causes the processing circuitry to perform operations according to embodiments disclosed herein. According to other embodiments, processing circuitry 311 may be defined to include memory so that a separate memory circuitry is not required.

As discussed herein, operations of the network node may be performed by machine learning model nodule 113, positioning module 303, prediction and estimating module 305, interference control module 307, processing circuitry 311, network interface 313, and/or transceiver 315. For example, processing circuitry 311 may control transceiver 315 to transmit downlink communications through transceiver 315 over a radio interface to one or more communication devices or network nodes and/or to receive uplink communications through transceiver 315 from one or more communication devices or network nodes over a radio interface. Similarly, processing circuitry 311 may control network interface 313 to transmit communications through network interface 313 to one or more other network nodes or communication devices and/or to receive communications through network interface from one or more other network nodes or communication devices. Moreover, modules may be stored in memory 309, machine learning model nodule 113, positioning module 303, prediction and estimating module 305, and/or interference control module 307 and these modules may provide instructions so that when instructions of a module are executed by processing circuitry 311, processing circuitry 311 performs respective operations (e.g., operations discussed herein with respect to example embodiments relating to network node operations of a non-public communication network).

While embodiments discussed below are explained in the non-limiting context of a neural network (e.g., a feed-forward neural network, a recurrent neural network (RNN), etc.), the invention is not so limited. Machine learning model of network node 113 (which can be trained in and obtained from cloud 115) of a network node of a non-public communication network may use other machine learning models, including without limitation for example, a random forest, an artificial intelligence agent, long-short term memory cells (LSTM), autoregressive integrated moving average (ARIMIA), etc.

Figure 4:
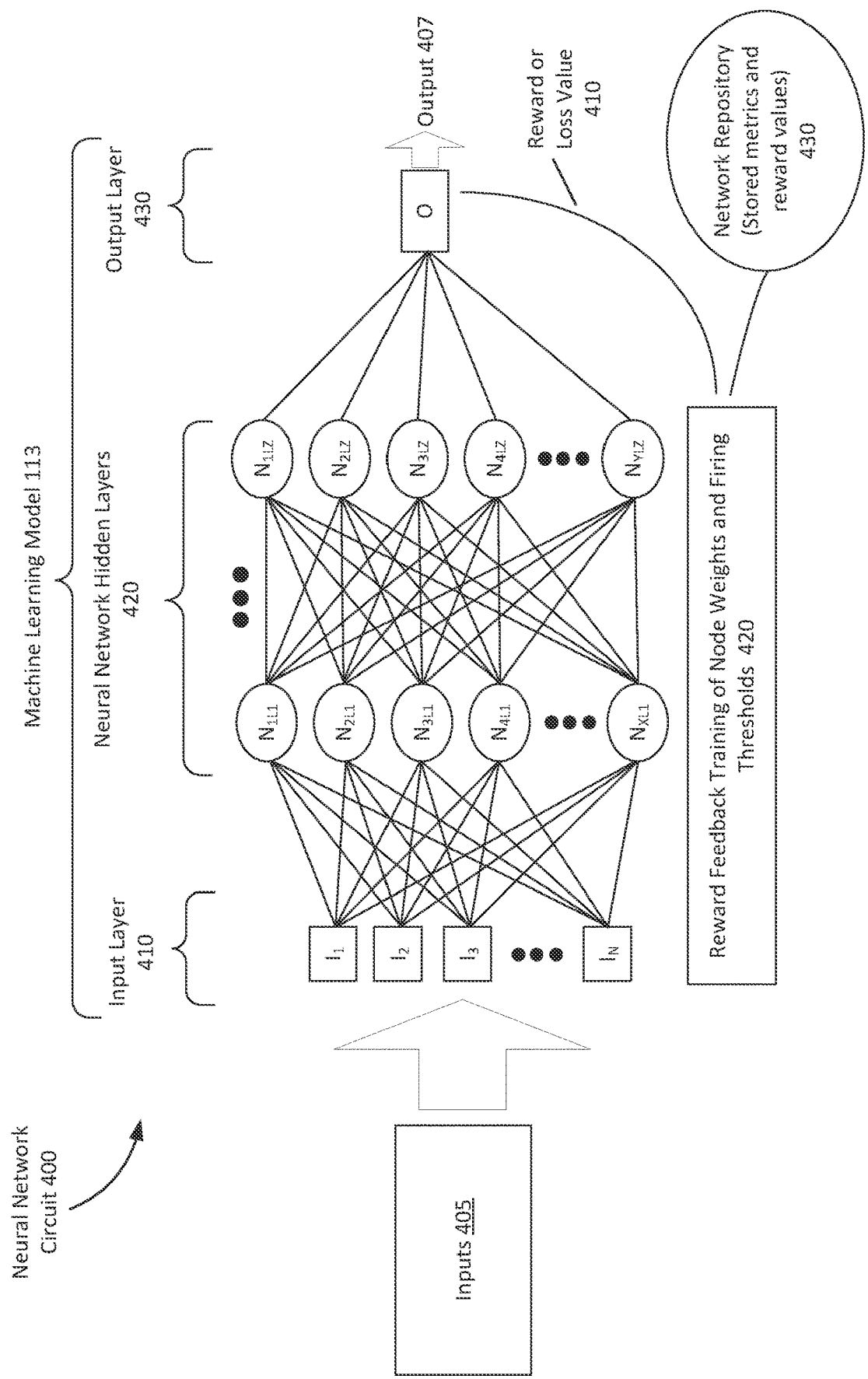
FIG. 4 is a schematic illustrating an exemplary neural network circuit in accordance with some embodiments.

FIG. 4 illustrates a non-limiting illustrative embodiment of a neural network circuit 400 for predicting a subsequent position of a communication device served by a public communication network for a subsequent time interval and/or for generating an indication for detecting that a communication device served by a public communication network is proximate a non-public communication network. Neural network circuit 400 includes an input layer 410 with input nodes "I", a sequence of hidden layers 420 each having a plurality of combining nodes, and an output layer 430 having an output node. Each of the input nodes "I" can be connected to receive a different type of information for use in performing the prediction and a defined location of the communication device served by the public communication network (e.g., a current position) and/or used in generating an indication for detecting that a communication device served by a public communication network is proximate a non-public communication network. Example operations of the combining nodes and output node are described in further detail below with regard to FIG. 5.

Figure 5:
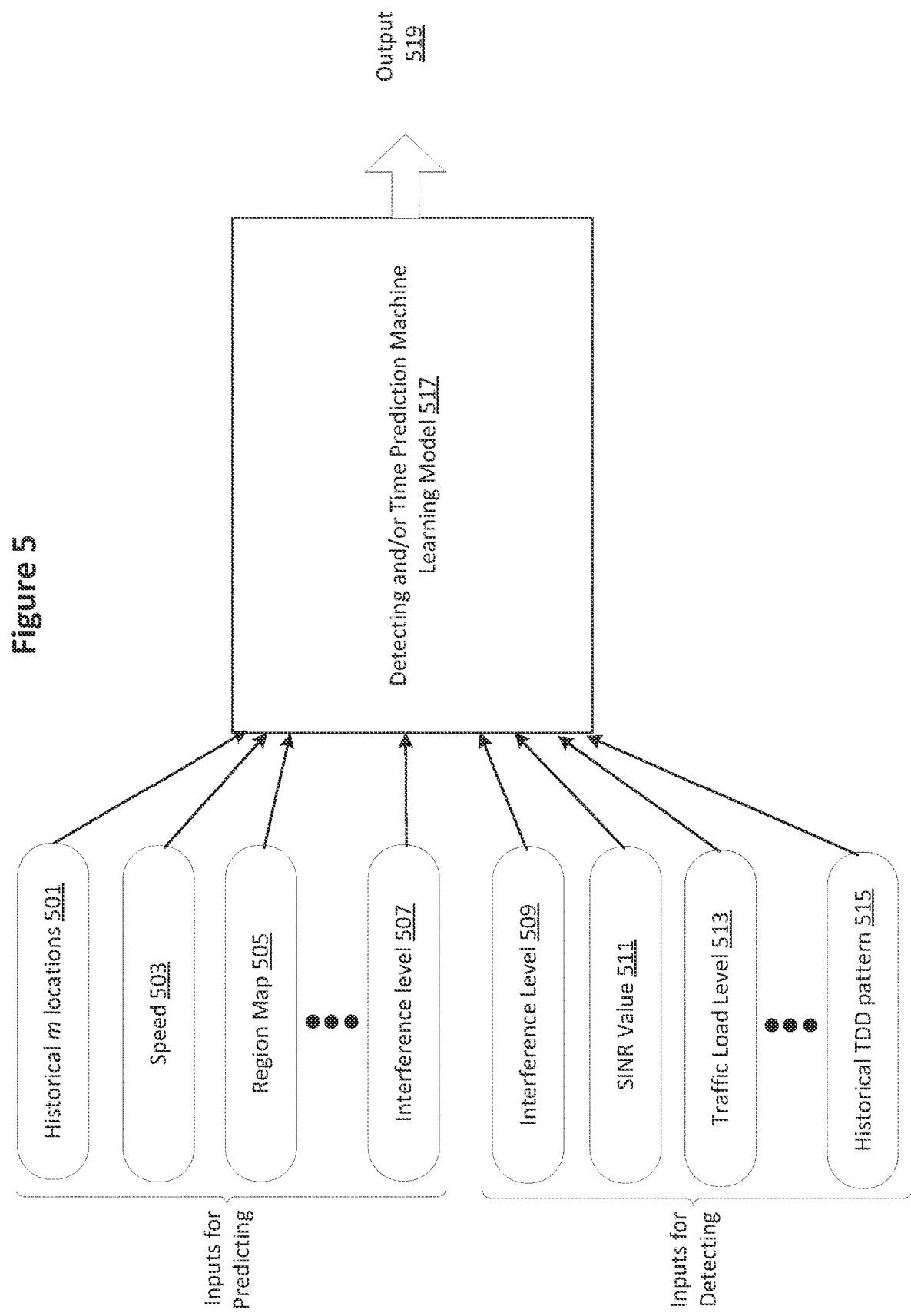
FIG. 5 is a block diagram and data flow diagram of an exemplary neural network circuit in accordance with some embodiments of the present disclosure.

FIG. 5 is a block diagram and data flow diagram of a neural network circuit 400 that can be used in the machine learning model module 113 of network node 103 in a non-public communication network.

In a non-limiting illustrative embodiment, neural network 400 can generate an output 519 providing a predicted future location for a subsequent time for a communication device served by a public communication network and perform feedback training of the node weights and firing thresholds 420 of the input layer 410, the neural network hidden layer 420, and the output layer 430.

In this exemplary embodiment, the neural network circuit 400 is a time prediction model 517 (e.g., a RNN) that includes the input layer 410 having a plurality of input nodes, the sequence of neural network hidden layers 420 each including a plurality of weight nodes, and the output layer 430 including an output node. In the particular non-limiting example of this illustrative embodiment, the input layer 410 includes input nodes I1 to IN (where N is any plural integer). Input information for use in performing the prediction includes, without limitation: a defined location(s) a communication device served by a public communication network (e.g., historical m locations 501), a speed 503 of a communication device served by a public communication network, a map of a region of the non-public communication network 505, an interference level on the non-public communication network 507, etc. The inputs are provided to different ones of the input nodes I1 to IN. A first one of the sequence of neural network hidden layers 420 includes weight nodes N1L1 (where "1L1" refers to a first weight node on layer one) to NXL1 (where X is any plural integer). A last one ("Z") of the sequence of neural network hidden layers 420 includes weight nodes N1LZ (where Z is any plural integer) to NYLZ (where Y is any plural integer). The output layer 430 includes an output node O.

In another non-limiting illustrative embodiment, neural network 400 can generate an output 519 providing an indication for detecting that a communication device served by a public communication network is proximate a non-public communication network and perform feedback training of the node weights and firing thresholds 420 of the input layer 410, the neural network hidden layer 420, and the output layer 430.

In this exemplary embodiment, the neural network circuit 400 is a feed-forward neural network 517 that includes the input layer 410 having a plurality of input nodes, the sequence of neural network hidden layers 420 each including a plurality of weight nodes, and the output layer 430 including an output node. In the particular non-limiting example of this illustrative embodiment, the input layer 410 includes input nodes I1 to IN (where N is any plural integer). Input information for use in performing the detecting includes, without limitation: interference level on the plurality of network nodes in the non-public communication network, a signal to interference plus noise ratio, SINR, value of at least one second communication device served by the non-public communication network, a traffic load level of neighboring network nodes from the plurality of network nodes in the non-public communication network and/or a traffic load level of at least one second communication device served by the non-public communication network, a historical time division duplex pattern received from the public communication network, wherein the non-public communication network and the public communication network are operated by a common operator etc. The inputs are provided to different ones of the input nodes I1 to IN. A first one of the sequence of neural network hidden layers 420 includes weight nodes N1L1 (where "1L1" refers to a first weight node on layer one) to NXL1 (where X is any plural integer). A last one ("Z") of the sequence of neural network hidden layers 420 includes weight nodes N1LZ (where Z is any plural integer) to NYLZ (where Y is any plural integer). The output layer 430 includes an output node O.

The neural network circuit 400 of FIG. 5 is an example that has been provided for ease of illustration and explanation of one embodiment. Other embodiments may include any non-zero number of input layers having any non-zero number of input nodes, any non-zero number of neural network layers having a plural number of weight nodes, and any non-zero number of output layers having any non-zero number of output nodes. The number of input nodes can be selected based on the number of information inputs (as discussed above) that are to be simultaneously processed.

The neural network model 400 can be operated to process different input information 501-515, etc., during a training mode by a training module through different inputs (e.g., input nodes I1 to IN) of the neural network model 400. Input information 501-515, etc. can be simultaneously or sequentially processed through different input nodes I1 to IN.

The neural network circuit 400 operates the input nodes of the input layer 410 to each receive different input information 501-515. Each of the input nodes multiply values that are input by a weight that is assigned to the input node to generate a weighted metric value. When the weighted metric value exceeds a firing threshold assigned to the input node, the input node then provides the weighted value to the combining nodes of the first one of the sequence of the hidden layers 420. The input node does not output the weighted value if and until the weighted value exceeds the assigned firing threshold.

An input layer 410 uses feedback of stored metrics and/or reward values from the network metrics repository 430 to adjust the weights and the firing weights of the input nodes of the input layer 410, and may further adjust the weights and the firing weights of the hidden layer nodes of the hidden layers 420 and the output node of the output layer 430. It is noted that the same numbering 430 is used for each of the output layer 430 and the network metrics repository 430. The input layer 410 may also adjust the weights and the firing weights responsive to real-time feedback of the output (as discussed herein) by the output node of the output layer 430.

Furthermore, the neural network circuit 400 operates the combining nodes of the first one of the sequence of the hidden layers 420 using weights that are assigned thereto to multiply and mathematically combine weighted metric values provided by the input nodes to generate combined metric values, and when the combined metric value generated by one of the combining nodes exceeds a firing threshold assigned to the combining node to then provide the combined metric value to the combining nodes of a next one of the sequence of the hidden layers 420.

Furthermore, the neural network circuit 400 operates the combining nodes of a last one of the sequence of hidden layers 420 using weights that are assigned thereto to multiply and combine the combined metric values provided by a plurality of combining nodes of a previous one of the sequence of hidden layers to generate combined metric values, and when the combined metric value generated by one of the combining nodes exceeds a firing threshold assigned to the combining node to then provide the combined metric value to the output node of the output layer 430.

Finally, the output node of the output layer 430 is then operated to combine the combined values to generate the output 407, 519.

Figure 6:
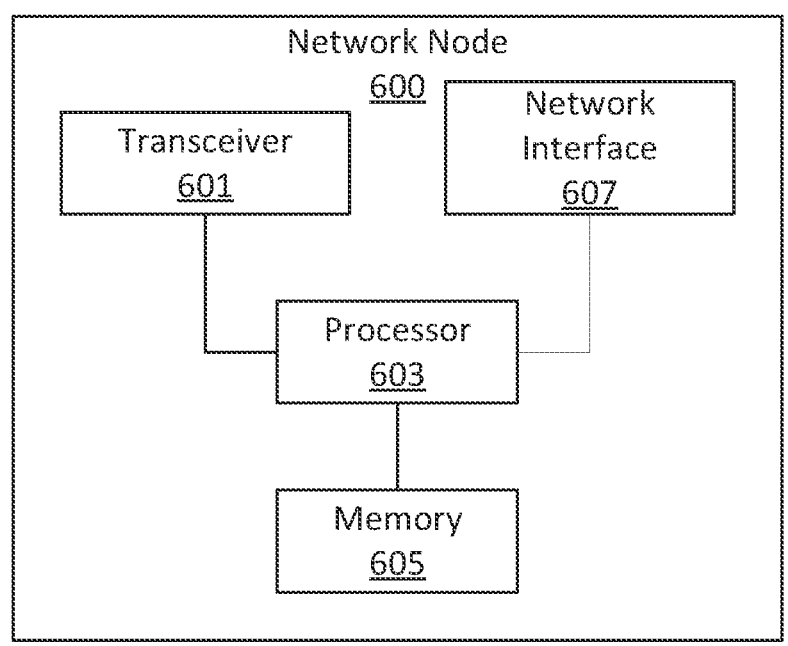
FIG. 6 is a block diagram illustrating a network node in a public communication network according to various embodiments of the present disclosure.

FIG. 6 is a block diagram illustrating elements of an network node 600 of a public communication network according to embodiments of the present disclosure. The network node may include network interface circuitry 607 configured to provide communications with other nodes and device (e.g., with other network nodes and communication devices) of a non-public communication network and the public communication network. The network node may also include processing circuitry 603 (also referred to as a processor) coupled to transceiver circuitry 601, and memory circuitry 605 (also referred to as memory) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the network node may be performed by processing circuitry 603, network interface 607, and/or transceiver 601. For example, processing circuitry 603 may control transceiver 601 to transmit downlink communications through transceiver 601 over a radio interface to one or more communication devices or network nodes and/or to receive uplink communications through transceiver 601 from one or more communication devices or network nodes over a radio interface. Similarly, processing circuitry 603 may control network interface 607 to transmit communications through network interface 607 to one or more other network nodes or communication devices and/or to receive communications through network interface from one or more other network nodes or communication devices. Moreover, modules may be stored in memory 605, and these modules may provide instructions so that when instructions of a module are executed by processing circuitry 603, processing circuitry 603 performs respective operations (e.g., operations discussed herein with respect to example embodiments relating to network node operations of a public communication network).

Now that the operations that the various components have been described, operations specific to the network node 103 in a non-public communication network (implemented using the structure of the block diagram of FIG. 3) will now be discussed with reference to the flow charts of FIGS. 7 and 8 according to various embodiments of the present disclosure. For example, modules may be stored in machine learning model nodule 113, positioning module 303, prediction and estimating module 305, interference control module 307, and/or memory 309 of FIG. 3. These modules may provide instructions so that when the instructions of a module are executed by respective network node machine learning model nodule 113, positioning module 303, prediction and estimating module 305, interference control module 307, and/or processing circuitry 311, processing circuitry of such modules and/or processing circuitry 311 performs respective operations of the flow charts of FIGS. 7 and 8. Each of the operations described in FIGS. 7 and 8 can be combined and/or omitted in any combination with each other, and it is contemplated that all such combinations fall within the spirit and scope of this disclosure.

Figure 7:
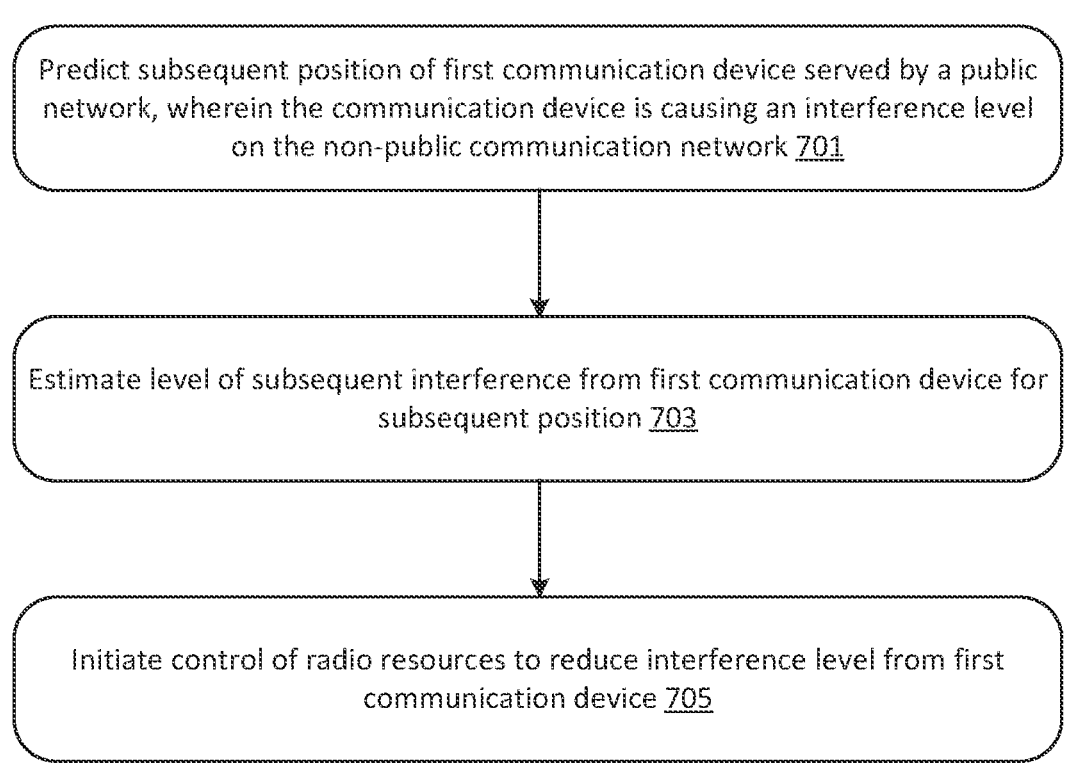
FIGS. 7 and 8 are flow charts illustrating operations of a network node in a non-public communication network according to various embodiments of the present disclosure.

Referring initially to FIG. 7, in various embodiments, the operations of the network node in the non-public communication network include predicting (701) a subsequent position of a first communication device served by a public communication network. The first communication device is causing an interference level on the non-public communication network. The operations of the network node further include estimating (703) a level of subsequent interference from the first communication device for the subsequent position. The operations of the network node further include initiating (705) control of radio resources to reduce the estimated interference level from the first communication device.

In some embodiments, the predicting includes a time series prediction using an artificial intelligence agent or a statistical analysis model to predict the subsequent position of the first communication device for a subsequent time interval based on a defined location of the first communication device and at least one of the following: at least one historical location of the first communication device; a speed of the first communication device; a map of a region of the non-public communication network; and the interference level on the non-public communication network.

In some embodiments, the estimating is based on the subsequent position and one or more of: a map of a region of the non-public communication network; a map of radio propagation within a region of the non-public communication network; and a historical signal strength measurement performed by the non-public communication network.

Figure 8:
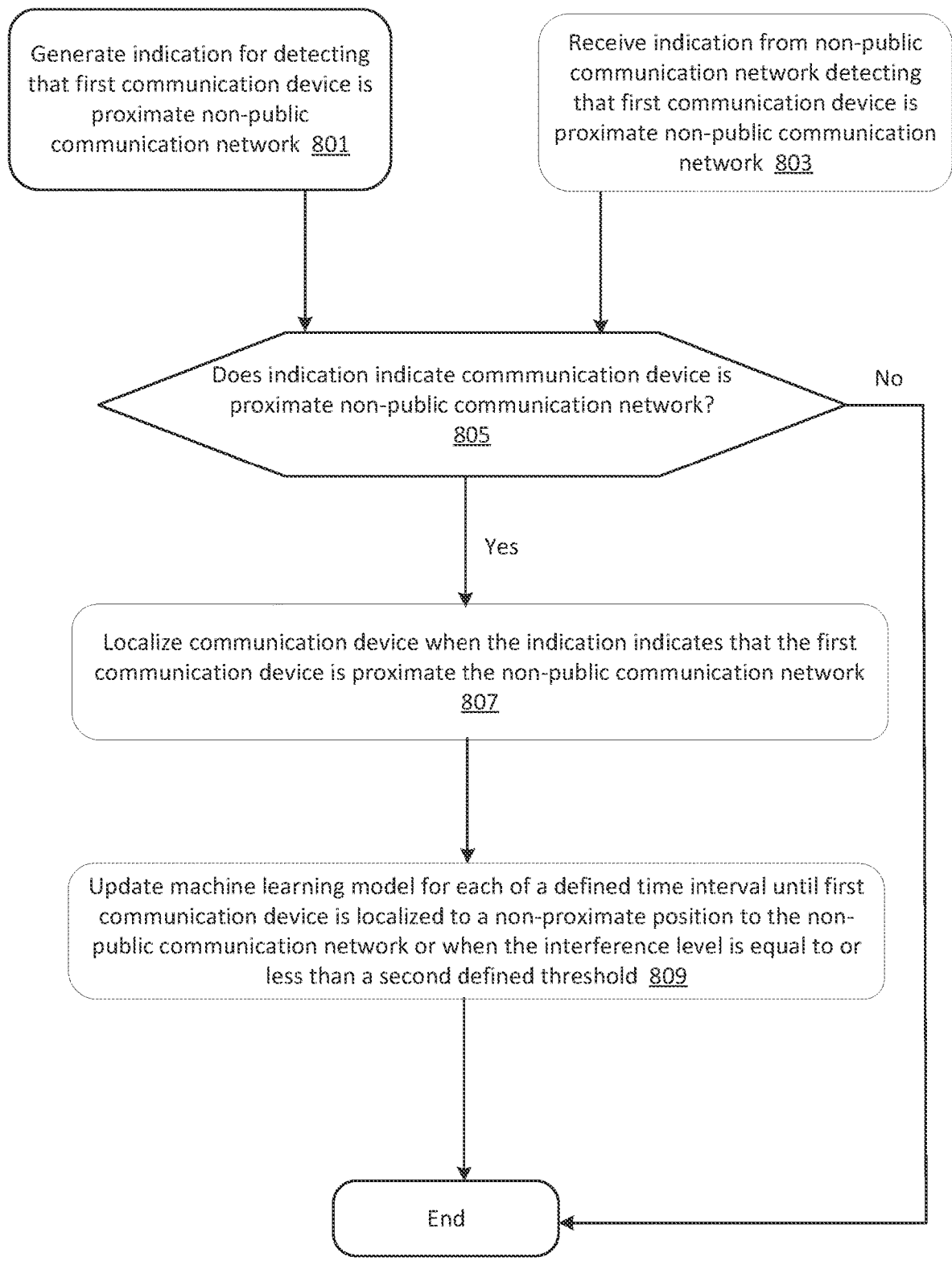

Referring to FIG. 8, in some embodiments, further operations that are performed by the network node include generating (801) an indication for detecting that the first communication device is proximate the non-public communication network.

In some embodiments, further operations that are performed by the network node include receiving (803) an indication from the non-public communication network detecting that the first communication device is proximate the non-public communication network.

In some embodiments, the indication is based on a measurement made by the network node or by another network node from a plurality of network nodes in the non-public communication network.

In some embodiments, the indication is an output from a machine learning model for the detecting, wherein the measurement is an input to the machine learning model and includes at least one of: the interference level on the plurality of network nodes in the non-public communication network; a SINR value of at least one second communication device served by the non-public communication network; a traffic load level of neighboring network nodes from the plurality of network nodes in the non-public communication network; a traffic load level of at least one second communication device served by the non-public communication network; and a historical time division duplex pattern received from the public communication network, wherein the non-public communication network and the public communication network are operated by a common operator.

In some embodiments, the machine learning model is iteratively trained before deploying the machine learning model at the network node and wherein the training uses a plurality of the inputs to the machine learning model from a plurality of network nodes in the non-public communication network to iteratively calculate an accuracy of an expected output associated with the plurality of the inputs that indicates whether a communication device is proximate the non-public communication network.

In some embodiments, the trained machine learning model is deployed at the plurality of network nodes in the non-public communication network and wherein the network node checks a similarity of the output of the network node with the output of another network node from the plurality of network nodes in the non-public communication network to determine prediction accuracy of the network node.

In some embodiments, the trained model deployed at the network node is updated when the accuracy of the trained model is less than a first defined threshold.

In some embodiments, further operations that are performed by the network node include localizing (807) the communication device when the indication indicates that the first communication device is proximate the non-public communication network.

In some embodiments, the localizing is based on the network node positioning the communication device or the network node receives information for localizing the communication device.

In some embodiments, the positioning is based on the public communication network sharing an identity of the communication device with the network node for the network node to perform position related measurements and one or more of: sending the interference level to a location server when the position related measurements is downlink based on the communication device sending a reference signal time difference measurement to the location server; measuring a time of arrival of a signal transmitted by the communication device and sending the time of arrival signal or a reference signal time difference, RSTD, measurement to the location server when the position related measurements is uplink based; and performing a round trip time procedure with the communication device based on transmitting a positioning reference signal, PRS, to the communication device when the position related measurement is round-trip time, RTT, based.

In some embodiments, the positioning is based on at least one of: receiving a notification from the public communication network that the communication device is proximate the non-public communication network; estimating an angle of arrival of at least one signal received from the communication device; and performing a different position related measurement based on the location server changing the position related measurement to the different position related measurement to reduce the interference level.

In some embodiments, the initiating control of radio resources to reduce the interference level from the first communication device comprises at least one of: initiating control of radio resources to reduce the interference level from the first communication device served by the public communication network towards the network node when the interference level disturbs uplink reception of a communication from a communication device served by the non-public communication network based on the predicted subsequent position of the first communication device served by the public communication network and the estimated level of subsequent interference from the first communication device served by the public communication network for the subsequent position; initiating control of radio resources to reduce the interference level from the first communication device served by the public communication network towards a communication device served by the non-public communication network when the interference level disturbs downlink reception of a communication from the network node based on the predicted subsequent position of a first communication device served by the public communication network and the estimated level of subsequent interference from the first communication device served by the public communication network for the subsequent position; informing the public communication network that the first communication device served by the public communication network is expected to interfere with the non-public communication network; and informing the public communication network that the control to reduce the interference level is no longer needed.

In some embodiments, further operations that are performed by the network node include updating (809) the machine learning model for each of a defined time interval until the first communication device is localized to a non-proximate position to the non-public communication network or when the interference level is equal to or less than a second defined threshold.

Various operations from the flow charts of FIGS. 7 and 8 may be optional with respect to some embodiments of a network node in a non-public communication network and related methods. For example, operations of blocks 801-809 of FIG. 8 may be optional.

Operations specific to the network node 111 in a public communication network (implemented using the structure of the block diagram of FIG. 6) will now be discussed with reference to the flow chart of FIG. 9 according to some embodiments of inventive concepts. For example, modules may be stored in memory 605 of FIG. 6, and these modules may provide instructions so that when the instructions of a module are executed by respective network node processing circuitry 603, processing circuitry 603 performs respective operations of the flow chart. Each of the operations described in FIG. 9 can be combined and/or omitted in any combination with each other, and it is contemplated that all such combinations fall within the spirit and scope of this disclosure.

In various embodiments, the operations of the network node in a public communication network include detecting (901) that a communication device served by the public communication network is expected to interfere with a non-public communication network. The operations of the network node further include performing (903) an action to reduce the interference from the communication device. The action is based on at least one or more of a scheduling limitation, a transmission power limitation, a handover, a split of resource block, an alternative route, and a non-allowed location.

In some embodiments, the detecting includes at least one of: receiving information from the non-public communication network notifying the network node of the expected interference; and accessing mobility measurements performed by the communication device.

In some embodiments, further operations that are performed by the network node include detecting (905) that the communication device is in a position that is not expected to cause interference with the non-public communication network; and removing (907) the scheduling limitation or the transmission power limitation.

In some embodiments, further operations that are performed by the network node include allowing (909) the communication device to use a same frequency with the non-public communication network based on a decrease of interference with the non-public communication network.

Figure 9:
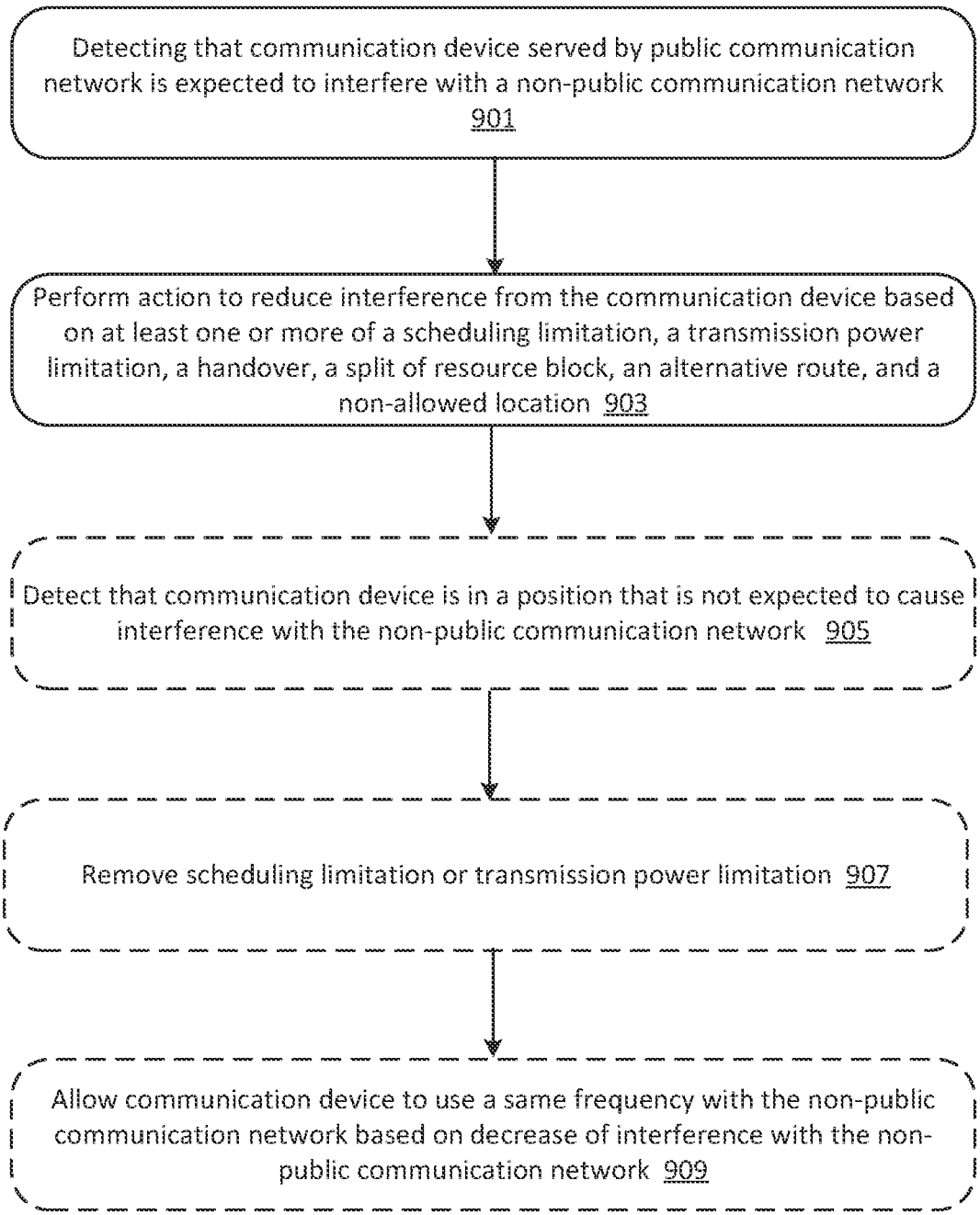
FIG. 9 is a flow chart illustrating operations of a network node in a public communication network according to various embodiments of the present disclosure.

Various operations from the flow chart of FIG. 9 may be optional with respect to some embodiments of a network node in a public communication network and related methods. For example, operations of blocks 905-909 of FIG. 9 may be optional.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Example embodiments are discussed below. Reference numbers/letters are provided in parenthesis by way of example/illustration without limiting example embodiments to particular elements indicated by reference numbers/letters.

Embodiment 1. A computer implemented method performed by a network node (103, 300) in a non-public communication network (101), the method comprising:
 predicting (701) a subsequent position of a first communication device served by a public communication network, wherein the first communication device is causing an interference level on the non-public communication network;
 estimating (703) a level of subsequent interference from the first communication device for the subsequent position; and
 initiating (705) control of radio resources to reduce the estimated interference level from the first communication device.

Embodiment 2. The method of Embodiment 1, wherein the predicting comprises a time series prediction using an artificial intelligence agent or a statistical analysis model to predict the subsequent position of the first communication device for a subsequent time interval based on a defined location of the first communication device and at least one of the following:
 at least one historical location of the first communication device;
 a speed of the first communication device;
 a map of a region of the non-public communication network; and
 the interference level on the non-public communication network.

Embodiment 3. The method of any of Embodiments 1 to 2, wherein the estimating is based on the subsequent position and one or more of:
 a map of a region of the non-public communication network;
 a map of radio propagation within a region of the non-public communication network; and
 a historical signal strength measurement performed by the non-public communication network.

Embodiment 4. The method of any of Embodiments 1 to 3, further comprising:
 generating (801) an indication for detecting that the first communication device is proximate the non-public communication network.

Embodiment 5. The method of any of Embodiments 1 to 3, further comprising:
 receiving (803) an indication from the non-public communication network detecting that the first communication device is proximate the non-public communication network.

Embodiment 6. The method of any of Embodiments 4 to 5, wherein the indication is based on a measurement made by the network node or by another network node from a plurality of network nodes in the non-public communication network.

Embodiment 7. The method of any of Embodiments 4 to 6, wherein the indication is an output from a machine learning model for the detecting, wherein the measurement is an input to the machine learning model and comprises at least one of:
 the interference level on the plurality of network nodes in the non-public communication network;
 a signal to interference plus noise ratio, SINR, value of at least one second communication device served by the non-public communication network;
 a traffic load level of neighboring network nodes from the plurality of network nodes in the non-public communication network;
 a traffic load level of at least one second communication device served by the non-public communication network; and
 a historical time division duplex pattern received from the public communication network, wherein the non-public communication network and the public communication network are operated by a common operator.

Embodiment 8. The method of Embodiment 7, wherein the machine learning model is iteratively trained before deploying the machine learning model at the network node and wherein the training uses a plurality of the inputs to the machine learning model from a plurality of network nodes in the non-public communication network to iteratively calculate an accuracy of an expected output associated with the plurality of the inputs that indicates whether a communication device is proximate the non-public communication network.

Embodiment 9. The method of Embodiment 8, wherein the trained machine learning model is deployed at the plurality of network nodes in the non-public communication network and wherein the network node checks a similarity of the output of the network node with the output of another network node from the plurality of network nodes in the non-public communication network to determine prediction accuracy of the network node.

Embodiment 10. The method of Embodiment 9, wherein the trained model deployed at the network node is updated when the accuracy of the trained model is less than a first defined threshold.

Embodiment 11. The method of any of Embodiments 1 to 10, further comprising:
 localizing (807) the communication device when the indication indicates that the first communication device is proximate the non-public communication network.

Embodiment 12. The method of Embodiment 11, wherein the localizing is based on the network node positioning the communication device or the network node receives information for localizing the communication device.

Embodiment 13. The method of any of Embodiments 1 to 12, wherein the positioning is based on the public communication network sharing an identity of the communication device with the network node for the network node to perform position related measurements and one or more of:
  sending the interference level to a location server when the position related measurements is downlink based on the communication device sending a reference signal time difference measurement to the location server;
  measuring a time of arrival of a signal transmitted by the communication device and sending the time of arrival signal or a reference signal time difference, RSTD, measurement to the location server when the position related measurements is uplink based; and
  performing a round trip time procedure with the communication device based on transmitting a positioning reference signal, PRS, to the communication device when the position related measurement is round-trip time, RTT, based.

Embodiment 14. The method of any of Embodiments 1 to 12, wherein the positioning is based on at least one of:
  receiving a notification from the public network that the communication device is proximate the non-public communication network;
  estimating an angle of arrival of at least one signal received from the communication device; and
  performing a different position related measurement based on the location server changing the position related measurement to the different position related measurement to reduce the interference level.

Embodiment 15. The method of any of Embodiments 1 to 14, wherein the initiating control of radio resources to reduce the interference level from the first communication device comprises at least one of:
  initiating control of radio resources to reduce the interference level from the first communication device served by the public communication network towards the network node when the interference level disturbs uplink reception of a communication from a communication device served by the non-public communication network based on the predicted subsequent position of the first communication device served by the public communication network and the estimated level of subsequent interference from the first communication device served by the public communication network for the subsequent position;
  initiating control of radio resources to reduce the interference level from the first communication device served by the public communication network towards a communication device served by the non-public communication network when the interference level disturbs downlink reception of a communication from the network node based on the predicted subsequent position of a first communication device served by the public communication network and the estimated level of subsequent interference from the first communication device served by the public communication network for the subsequent position;
  informing the public communication network that the first communication device served by the public communication network is expected to interfere with the non-public communication network; and
  informing the public communication network that the control to reduce the interference level is no longer needed.

Embodiment 16. The method of any of Embodiments 1 to 15, further comprising:
  updating (809) the machine learning model for each of a defined time interval until the first communication device is localized to a non-proximate position to the non-public communication network or when the interference level is equal to or less than a second defined threshold.

Embodiment 17. A computer implemented method performed by a network node (111, 600) in a public communication network (109), the method comprising:
  detecting (901) that a communication device served by the public communication network is expected to interfere with a non-public communication network; and
  performing (903) an action to reduce the interference from the communication device, wherein the action is based on at least one or more of a scheduling limitation, a transmission power limitation, a handover, a split of resource block, an alternative route, and a non-allowed location.

Embodiment 18. The method of Embodiment 17, wherein the detecting comprises at least one of:
  receiving information from the non-public communication network notifying the network node of the expected interference; and
  accessing mobility measurements performed by the communication device.

Embodiment 19. The method of any of Embodiments 17 to 18, further comprising:
  detecting (905) that the communication device is in a position that is not expected to cause interference with the non-public communication network; and
  removing (907) the scheduling limitation or the transmission power limitation.

Embodiment 20. The method of Embodiment 19, further comprising:
  allowing (909) the communication device to use a same frequency with the non-public communication network based on a decrease of interference with the non-public communication network.

Embodiment 21. A network node (103, 300) in a non-public communication network (101) comprising:
  at least one processor (311);
  at least one memory (309) connected to the at least one processor (311) and storing program code that is executed by the at least one processor (311) to perform operations comprising:
  predicting a subsequent position of a first communication device served by a public communication network, wherein the first communication device is causing an interference level on the non-public communication network;
  estimating a level of subsequent interference from the first communication device for the subsequent position; and
  initiating control of radio resources to reduce the estimated interference level from the first communication device.

Embodiment 22. A network node (103, 300) in a non-public communication network (101) comprising:
  at least one processor (311);
  at least one memory (309) connected to the at least one processor (311) and storing program code that is executed by the at least one processor (311) to perform operations according to any of Embodiments 2-16.

Embodiment 23. A network node (103, 300) in a non-public communication network (101) adapted to perform operations comprising:

predicting a subsequent position of a first communication device served by a public communication network, wherein the first communication device is causing an interference level on the non-public communication network;

estimating a level of subsequent interference from the first communication device for the subsequent position; and initiating control of radio resources to reduce the estimated interference level from the first communication device.

Embodiment 24. A network node (103, 300) in a non-public communication network (101) adapted to perform operations according to any of Embodiments 2-16.

Embodiment 25. A computer program comprising program code to be executed by processing circuitry (311) of a network node (103, 300), whereby execution of the program code causes the network node to perform operations comprising:

predicting a subsequent position of a first communication device served by a public communication network, wherein the first communication device is causing an interference level on the non-public communication network;

estimating a level of subsequent interference from the first communication device for the subsequent position; and initiating control of radio resources to reduce the estimated interference level from the first communication device.

Embodiment 26. A computer program comprising program code to be executed by processing circuitry (311) of a network node (103, 300), whereby execution of the program code causes the network node to perform operations according to any of Embodiments 2-16.

Embodiment 27. A computer program product comprising a non-transitory storage medium including program code to be executed by processing circuitry (311) of network node (103, 300), whereby execution of the program code causes the network node to perform operations comprising:

predicting a subsequent position of a first communication device served by a public communication network, wherein the first communication device is causing an interference level on the non-public communication network;

estimating a level of subsequent interference from the first communication device for the subsequent position; and initiating control of radio resources to reduce the estimated interference level from the first communication device.

Embodiment 28. A computer program product comprising a non-transitory storage medium including program code to be executed by processing circuitry (311) of network node (103, 300), whereby execution of the program code causes the network node to perform operations according to any of Embodiments 2-16.

Embodiment 29. A network node (111, 600) in a public communication network (109) comprising:

at least one processor (603);

at least one memory (605) connected to the at least one processor (603) and storing program code that is executed by the at least one processor (603) to perform operations comprising:

detecting (901) that a communication device served by the public communication network is expected to interfere with a non-public communication network; and performing (903) an action to reduce the interference from the communication device, wherein the action is based on at least one or more of a scheduling limitation, a transmission power limitation, a handover, a split of resource block, an alternative route, and a non-allowed location.

Embodiment 30. A network node (111, 600) in a public communication network (109) comprising:

at least one processor (603);

at least one memory (605) connected to the at least one processor (603) and storing program code that is executed by the at least one processor (603) to perform operations according to any of Embodiments 18-20.

Embodiment 31. A network node (111, 600) in a public communication network (109) adapted to perform operations comprising:

detecting (901) that a communication device served by the public communication network is expected to interfere with a non-public communication network; and performing (903) an action to reduce the interference from the communication device, wherein the action is based on at least one or more of a scheduling limitation, a transmission power limitation, a handover, a split of resource block, an alternative route, and a non-allowed location.

Embodiment 32. A network node (111, 600) in a public communication network (109) adapted to perform operations according to any of Embodiments 18-20.

Embodiment 33. A computer program comprising program code to be executed by processing circuitry (603) of a network node (111, 600), whereby execution of the program code causes the network node to perform operations comprising:

detecting (901) that a communication device served by the public communication network is expected to interfere with a non-public communication network; and performing (903) an action to reduce the interference from the communication device, wherein the action is based on at least one or more of a scheduling limitation, a transmission power limitation, a handover, a split of resource block, an alternative route, and a non-allowed location.

Embodiment 34. A computer program comprising program code to be executed by processing circuitry (603) of a network node (111, 600), whereby execution of the program code causes the network node to perform operations according to any of Embodiments 18-20.

Embodiment 35. A computer program product comprising a non-transitory storage medium including program code to be executed by processing circuitry (603) of a network node (111, 600), whereby execution of the program code causes the network node to perform operations comprising:

detecting (901) that a communication device served by the public communication network is expected to interfere with a non-public communication network; and performing (903) an action to reduce the interference from the communication device, wherein the action is based on at least one or more of a scheduling limitation, a transmission power limitation, a handover, a split of resource block, an alternative route, and a non-allowed location.

Embodiment 36. A computer program product comprising a non-transitory storage medium including program code to be executed by processing circuitry (603) of a network node (111, 600), whereby execution of the program code causes the network node to perform operations according to any of Embodiments 18-20.

Explanations are provided below for various abbreviations/acronyms used in the present disclosure.

| Abbreviation | Explanation |
| --- | --- |
| URLLC | Ultra-reliable low latency communications |
| eMBB | enhanced mobile broadband |
| E-UTRA | Evolved UTRA |
| E-UTRAN | Evolved UTRAN |
| TDD | Time division duplex |
| TTI | Transmission time interval |
| D or DL | Downlink |
| U or UL | Uplink |
| NR | New Radio |
| TOA | Time of arrival |
| LSTM | Long short term memory |
| ARIMA | Autoregressive integrated moving average |
| RNN | Recurrent neural network |
| UTRA | Universal Terrestrial Radio Access |
| UTRAN | Universal Terrestrial Radio Access Network |

References are identified below.
1. Q. Fan, H. Lu, P. Hong, and C. Chen, "Resource Allocation in Dynamic TDD Heterogeneous Networks under Mixed Traffic", August 2016.
2. M. Ding, D. Lopez-Perez, W. Chen, "Small cell dynamic TDD transmissions in heterogeneous networks", in Proc. of IEEE International Conference on Communications (ICC), Sydney, Australia, June 2014.
3. Q. Fan, H. Lu, P. Hong, and C. Chen, "Resource Allocation in Dynamic TDD Heterogeneous Networks under Mixed Traffic", arXiv:1608.06754, August 2016.
4. U. Challita, K. Hiltunen, M. Tercero, "Performance evaluation for the co-existence of eMBB and URLLC networks: synchronized versus unsynchronized TDD", VTC fall, Honolulu, Hawaii, USA, September 2019.
5. U. Challita and K. Hiltunen, "A Method for Enhanced co-existence of eMBB and URLLC networks for the case of unsynchronized TDD", 2019.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 10:
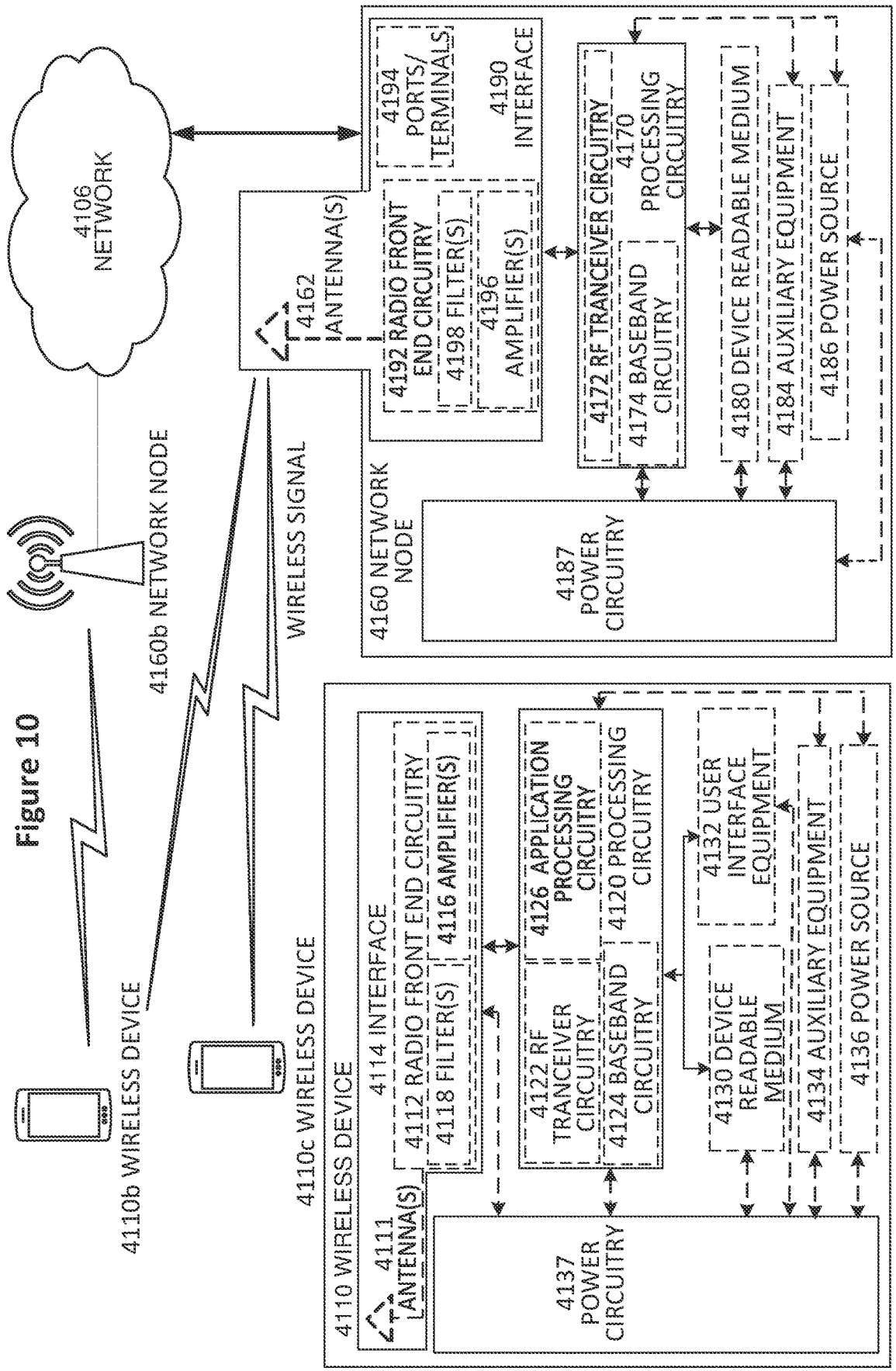
FIG. 10 is a block diagram of a wireless network in accordance with some embodiments.

FIG. 10 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 4106, network nodes 4160 and 4160b, and WDs 4110, 4110b, and 4110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network or wide local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 4106 may comprise one or more backhaul networks, core networks, IP networks, public switched telephone networks (PSTNs), packet data networks, optical networks, wide-area networks (WANs), local area networks (LANs), WLANs, wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, Wide CDMA (WCDMA), LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 10 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 11:
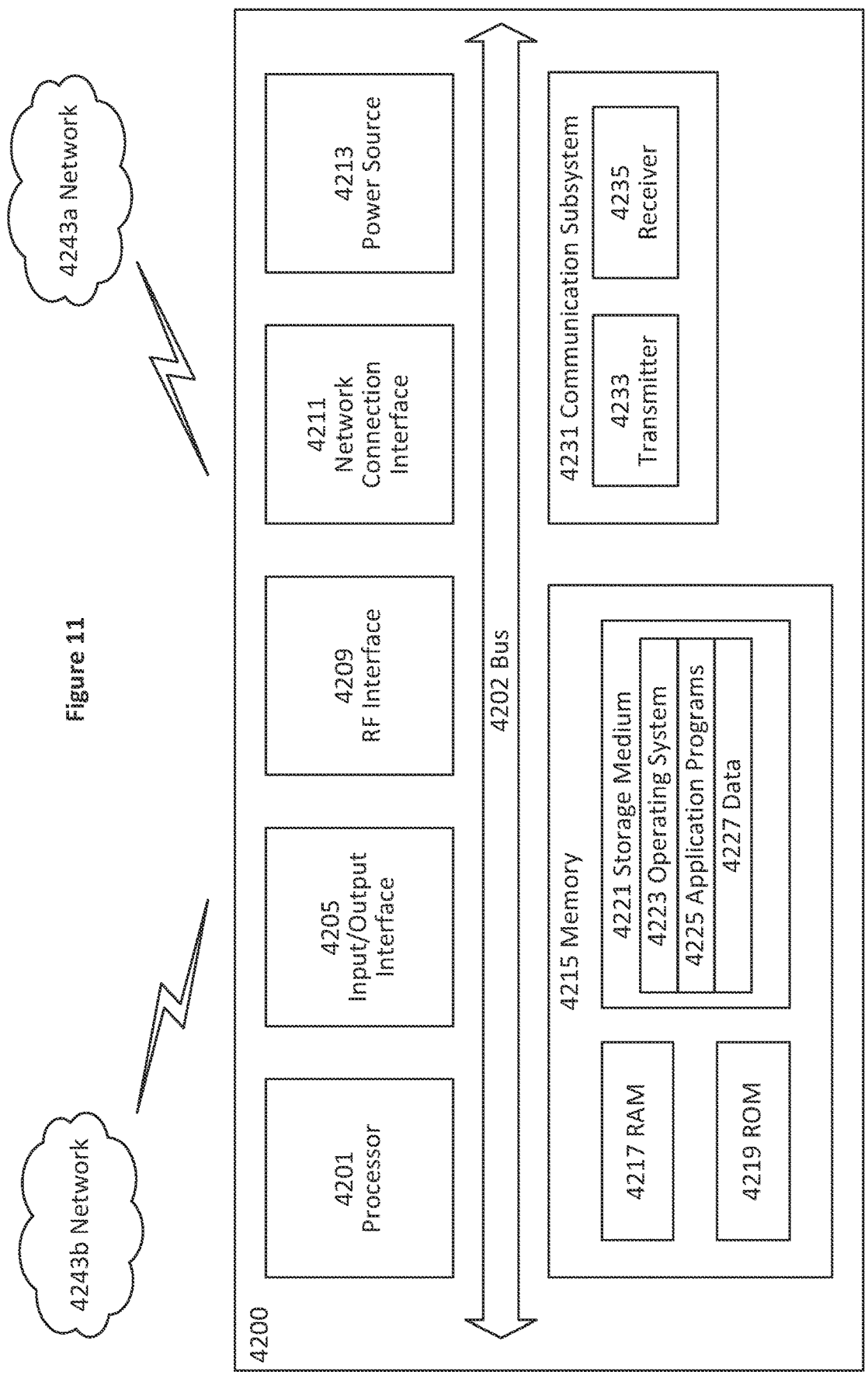
FIG. 11 is a block diagram of a user equipment in accordance with some embodiments.

FIG. 11 illustrates a user equipment (UE) in accordance with some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3GPP, including a NB-IoT UE, a machine type communication (MTC) UE, and/or an enhanced MTC (eMTC) UE. UE 4200, as illustrated in FIG. 11, is one example of a WD configured for communication in accordance with one or more communication standards promulgated by the 3GPP, such as 3GPP's GSM, UMTS, LTE, and/or 5G standards. As mentioned previously, the term WD and UE may be used interchangeably. Accordingly, although FIG. 11 is a UE, the components discussed herein are equally applicable to a WD, and vice-versa.

In FIG. 11, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 11, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, code division multiplexing access (CDMA), WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200.

Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A computer implemented method performed by a network node in a non-public communication network, the computer implemented method comprising:
   predicting a subsequent position of a first communication device served by a public communication network, wherein the first communication device is causing an interference level on the non-public communication network;
   estimating a level of subsequent interference from the first communication device for the predicted subsequent position; and
   initiating control of radio resources to reduce the estimated level of subsequent interference from the first communication device.

2. The computer implemented method of claim 1, wherein the predicting comprises a time series prediction using an artificial intelligence agent or a statistical analysis model to predict the subsequent position of the first communication device for a subsequent time interval based on a defined location of the first communication device and at least one of the following:
   at least one historical location of the first communication device;
   a speed of the first communication device;
   a map of a region of the non-public communication network; and
   the interference level on the non-public communication network.

3. The computer implemented method of claim 1, wherein the estimating is based on the subsequent position and one or more of:
   a map of a region of the non-public communication network;
   a map of radio propagation within a region of the non-public communication network; and
   a historical signal strength measurement performed by the non-public communication network.

4. The computer implemented method of claim 1, further comprising:
   generating an indication for detecting that the first communication device is proximate the non-public communication network.

5. The computer implemented method of claim 1, further comprising:
   receiving an indication from the non-public communication network indicating that the first communication device is proximate the non-public communication network.

6. The computer implemented method of claim 4, wherein the indication is based on a measurement made by the network node or by another network node from a plurality of network nodes in the non-public communication network.

7. The computer implemented method of claim 6, wherein the indication is an output from a machine learning model for the detecting, wherein the measurement is an input to the machine learning model and comprises at least one of:
   the interference level on the plurality of network nodes in the non-public communication network;
   a signal to interference plus noise ratio, SINR, value of at least one second communication device served by the non-public communication network;
   a traffic load level of neighboring network nodes from the plurality of network nodes in the non-public communication network;
   a traffic load level of at least one second communication device served by the non-public communication network; and
   a historical time division duplex pattern received from the public communication network, wherein the non-public communication network and the public communication network are operated by a common operator.

8. The computer implemented method of claim 7, wherein the machine learning model is iteratively trained before deploying the machine learning model at the network node and wherein the training uses a plurality of the inputs to the machine learning model from a plurality of network nodes in the non-public communication network to iteratively calculate an accuracy of an expected output associated with the plurality of the inputs that indicates whether a communication device is proximate the non-public communication network.

9. The computer implemented method of claim 8, wherein the trained machine learning model is deployed at the plurality of network nodes in the non-public communication network and wherein the network node checks a similarity of the output of the network node with the output of another network node from the plurality of network nodes in the non-public communication network to determine prediction accuracy of the network node.

10. The computer implemented method of claim 9, wherein the trained model deployed at the network node is updated when the accuracy of the trained model is less than a first defined threshold.

11. The computer implemented method of claim 4, further comprising:
  localizing the communication device when the indication indicates that the first communication device is proximate the non-public communication network.

12. The computer implemented method of claim 11, wherein the localizing is based on the network node positioning the communication device or the network node receives information for localizing the communication device.

13. The computer implemented method of claim 1, wherein the positioning is based on the public communication network sharing an identity of the communication device with the network node for the network node to perform position related measurements and one or more of:
  sending the interference level to a location server when the position related measurements is downlink based on the communication device sending a reference signal time difference measurement to the location server;
  measuring a time of arrival of a signal transmitted by the communication device and sending the time of arrival signal or a reference signal time difference, RSTD, measurement to the location server when the position related measurements is uplink based; and
  performing a round trip time procedure with the communication device based on transmitting a positioning reference signal, PRS, to the communication device when the position related measurement is round-trip time, RTT, based.

14. The computer implemented method of claim 1, wherein the positioning is based on at least one of:
  receiving a notification from the public network that the communication device is proximate the non-public communication network;
  estimating an angle of arrival of at least one signal received from the communication device; and
  performing a different position related measurement based on the location server changing the position related measurement to the different position related measurement to reduce the interference level.

15. The computer implemented method of claim 1, wherein the initiating control of radio resources to reduce the interference level from the first communication device comprises at least one of:
  initiating control of radio resources to reduce the interference level from the first communication device served by the public communication network towards the network node when the interference level disturbs uplink reception of a communication from a communication device served by the non-public communication network based on the predicted subsequent position of the first communication device served by the public communication network and the estimated level of subsequent interference from the first communication device served by the public communication network for the subsequent position;
  initiating control of radio resources to reduce the interference level from the first communication device served by the public communication network towards a communication device served by the non-public communication network when the interference level disturbs downlink reception of a communication from the network node based on the predicted subsequent position of a first communication device served by the public communication network and the estimated level of subsequent interference from the first communication device served by the public communication network for the subsequent position;
  informing the public communication network that the first communication device served by the public communication network is expected to interfere with the non-public communication network; and
  informing the public communication network that the control to reduce the interference level is no longer needed.

16. The computer implemented method of claim 7, further comprising:
  updating the machine learning model for each of a defined time interval until the first communication device is localized to a non-proximate position to the non-public communication network or when the interference level is equal to or less than a second defined threshold.

17. A network node in a non-public communication network, the network node comprising:
  processing circuitry;
  memory coupled with the processing circuitry, wherein the memory includes instructions that when executed by the processing circuitry causes the network node to perform operations comprising:
  predict a subsequent position of a first communication device served by a public communication network, wherein the first communication device is causing an interference level on the non-public communication network;
  estimate a level of subsequent interference from the first communication device for the predicted subsequent position; and
  initiate control of radio resources to reduce the estimated level of subsequent interference from the first communication device.

18. The network node according to claim 17, wherein the predicting comprises a time series prediction using an artificial intelligence agent or a statistical analysis model to predict the subsequent position of the first communication device for a subsequent time interval based on a defined location of the first communication device and at least one of the following:
  at least one historical location of the first communication device;
  a speed of the first communication device;
  a map of a region of the non-public communication network; and
  the interference level on the non-public communication network.

19. A computer program product comprising a non-transitory storage medium including program code to be executed by processing circuitry of network node, whereby execution of the program code causes the network node to perform operations comprising:
  predict a subsequent position of a first communication device served by a public communication network, wherein the first communication device is causing an interference level on a non-public communication network;
  estimate a level of subsequent interference from the first communication device for the predicted subsequent position; and
  initiate control of radio resources to reduce the estimated level of subsequent interference from the first communication device.

20. The computer program product according to claim 19, wherein the predicting comprises a time series prediction using an artificial intelligence agent or a statistical analysis model to predict the subsequent position of the first communication device for a subsequent time interval based on a defined location of the first communication device and at least one of the following:
- at least one historical location of the first communication device;
- a speed of the first communication device;
- a map of a region of the non-public communication network; and
- the interference level on the non-public communication network.

\* \* \* \* \*